US012712650B2

(12) United States Patent
Sakamoto et al.

(10) Patent No.: US 12,712,650 B2
(45) Date of Patent: Aug. 18, 2026

(54) ELECTRONIC APPARATUS, ELECTRONIC SYSTEM, METHOD, AND STORAGE MEDIUM

(71) Applicant: KABUSHIKI KAISHA TOSHIBA, Tokyo (JP)

(72) Inventors: Takafumi Sakamoto, Tokyo (JP); Koji Akita, Yokohama Kanagawa (JP); Yuki Yonezawa, Ayase Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 555 days.

(21) Appl. No.: 18/178,928

(22) Filed: Mar. 6, 2023

(65) Prior Publication Data

US 2024/0097806 A1 Mar. 21, 2024

(30) Foreign Application Priority Data

Sep. 16, 2022 (JP) ................................ 2022-148153

(51) Int. Cl.
*H04B 17/345* (2015.01)
*H04B 17/318* (2015.01)

(52) U.S. Cl.
CPC ......... *H04B 17/345* (2015.01); *H04B 17/318* (2015.01)

(58) Field of Classification Search
CPC ............................ H04B 17/345; H04B 17/318
See application file for complete search history.

(56) References Cited

U.S. PATENT DOCUMENTS

| | | | | |
|---|---|---|---|---|
| 7,779,575 | B2 | 8/2010 | Hirafuji et al. | |
| 8,930,146 | B2 | 1/2015 | Katsukura et al. | |
| 9,161,332 | B2 | 10/2015 | Nagata | |
| 2006/0244496 | A1 * | 11/2006 | Kawakita | F02P 3/0552 327/110 |
| 2022/0077940 | A1 | 3/2022 | Sakamoto et al. | |

FOREIGN PATENT DOCUMENTS

| | | | | |
|---|---|---|---|---|
| EP | 3264061 | A1 * | 1/2018 | G01M 17/08 |
| JP | 2005-142750 | A | 6/2005 | |
| JP | 2008-167696 | A | 7/2008 | |
| JP | 2011-14156 | A | 1/2011 | |
| JP | 4862117 | B2 | 1/2012 | |
| JP | 2012-127932 | A | 7/2012 | |
| JP | 2015-73242 | A | 4/2015 | |
| JP | 2022-45197 | A | 3/2022 | |

* cited by examiner

*Primary Examiner* — Duc C Ho
(74) *Attorney, Agent, or Firm* — Finnegan, Henderson, Farabow, Garrett & Dunner, LLP

(57) ABSTRACT

According to one embodiment, an electronic apparatus includes a processing circuitry configured to estimate a position at which electromagnetic noise occurs based on propagation data in communication between a first wireless device located at a first position and second wireless devices located at second positions, and position information indicating the first position and the second positions.

20 Claims, 15 Drawing Sheets

The success or failure of reception of the transmission packets from the wireless device 200D1

| transmission pkt No. | wireless device 200D2 | … | wireless device 200D5 | wireless device 200D6 | … | wireless device 200DN |
|---|---|---|---|---|---|---|
| 1 | ○ | … | ○ | ○ | … | ○ |
| 2 | ○ | … | ○ | ○ | … | ○ |
| 3 | × | … | ○ | × | … | ○ |
| 4 | ○ | … | ○ | ○ | … | × |
| 5 | × | … | ○ | × | … | ○ |
| 6 | ○ | … | ○ | ○ | … | ○ |
| 7 | ○ | … | ○ | ○ | … | ○ |
| 8 | × | … | ○ | × | … | ○ |
| 9 | × | … | × | ○ | … | ○ |
| 10 | ○ | … | ○ | ○ | … | ○ |

FIG. 9

PER between wireless devices 200[%]

reception wireless device No.

transmission wireless device No.

| | 200D1 | 200D2 | | 200D5 | 200D6 | | 200DN |
|---|---|---|---|---|---|---|---|
| 200D1 | | 40 | … | 10 | 30 | … | 10 |
| 200D2 | 10 | | … | 10 | 30 | … | 0 |
| ⋮ | | | … | | | … | |
| 200D5 | 0 | 30 | … | | 40 | … | 10 |
| 200D6 | 10 | 40 | … | 10 | | … | 10 |
| ⋮ | | | … | | | … | |
| 200DN | 10 | 30 | … | 0 | 30 | … | |

FIG.10

ELECTRONIC APPARATUS, ELECTRONIC SYSTEM, METHOD, AND STORAGE MEDIUM

CROSS-REFERENCE TO RELATED APPLICATIONS

This application is based upon and claims the benefit of priority from Japanese Patent Application No. 2022-148153, filed on Sep. 16, 2022; the entire contents of which are incorporated herein by reference.

FIELD

Embodiments described herein relate generally to an electronic apparatus, an electronic system, a method, and a storage medium.

BACKGROUND

When communication is performed between wireless devices, electromagnetic noise may be generated in a device or the like installed in the vicinity. Due to the electromagnetic noise, there is a possibility that communication between the wireless devices is inhibited. A technique for estimating a place where the electromagnetic noise is generated is required.

BRIEF DESCRIPTION OF THE DRAWINGS

FIG. 9 is a diagram illustrating an example of propagation data of the wireless devices 200 on the receiving side when the wireless device 200D1 is on the transmitting side.

FIG. 10 is a diagram illustrating a reception result of communication between the wireless devices 200 on the transmission side and the wireless devices 200 on the receiving side in the wireless devices 200D1 to 200DN.

DETAILED DESCRIPTION

Figure 1:
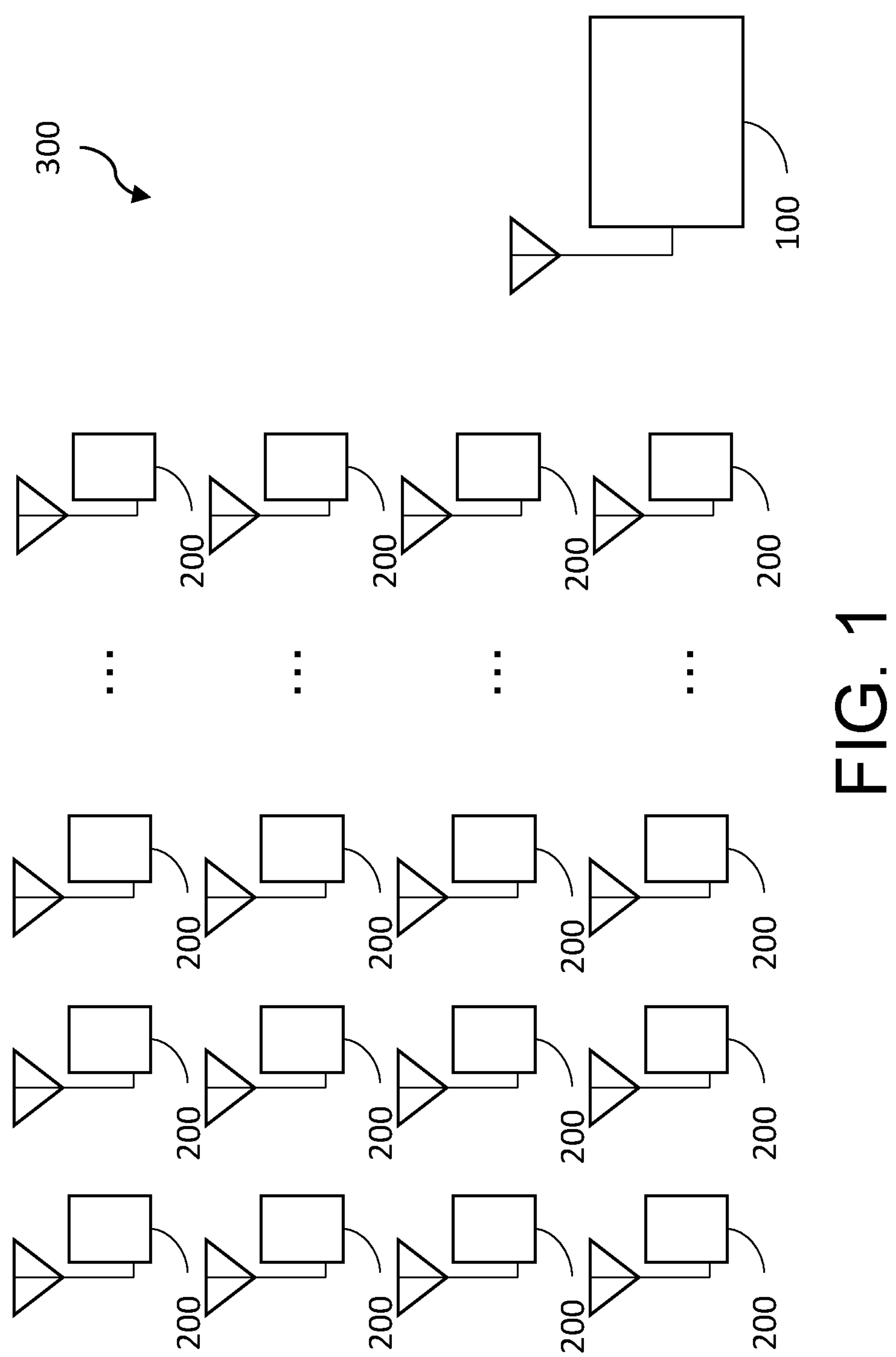
FIG. 1 is a schematic diagram of a communication system 300 according to a first embodiment.

According to one embodiment, an electronic apparatus includes a processing circuitry configured to estimate a position at which electromagnetic noise occurs based on propagation data in communication between a first wireless device located at a first position and second wireless devices located at second positions, and position information indicating the first position and the second positions.

Hereinafter, embodiments of the present invention will be described in reference to the drawings. Disclosure is only an example, invention is not limited by the contents described in the following embodiments. In the drawings, the size, shape, and the like may be schematically represented to make the description more clear. In the multiple drawings, corresponding elements are denoted by the same reference numerals, and detailed description may be omitted.

First Embodiment

A first embodiment will be described. FIG. 1 illustrates a communication system 300 of a first embodiment. The communication system 300 includes an estimation apparatus 100 and a plurality of wireless devices 200. The estimation apparatus 100 estimates a position at which electromagnetic noise occurs on the basis of propagation data in communication between the plurality of wireless devices 200 and information on positions at which the plurality of wireless devices 200 are present (hereinafter also referred to as position information). The electromagnetic noise of the present embodiment is electromagnetic noise that occurs irregularly and is caused by the operation of a device installed in the vicinity. For example, electromagnetic noise due to spark discharge occurs irregularly and is more difficult to detect than electromagnetic noise that occurs constantly. In the estimation apparatus 100 of the present embodiment, it is possible to estimate the position of the electromagnetic noise that occurs irregularly. The estimation apparatus 100 is also referred to as an electronic apparatus, and the communication system 300 is also referred to as an electronic system. In addition, the estimation of the position is not limited to the estimation of the coordinates, but includes the estimation of the coordinates, the estimation of the range, and a combination thereof.

As an application example, in a case where the wireless device 200 is provided in an apparatus, for example, a power generation apparatus of sunlight, wind power, or the like, a battery module, a lighting fixture, an air-conditioning apparatus, or the like, the estimation apparatus 100 estimates a position where electromagnetic noise is occurred, and thus can notify a user that there is a possibility that an abnormality in which electromagnetic noise occurs in the apparatus or the like in which the wireless device 200 is provided. In this application example, in a system in which a plurality of these apparatuses are provided, electromagnetic noise may be irregularly occurred due to deterioration or damage of an element or a wiring in the apparatus, a connection cable between the apparatuses, or spark discharge. The irregular occurrence of the electromagnetic noise indicates that the occurrence of the electromagnetic noise is temporally biased. For example, when a predetermined period (for example, on a daily basis, on a weekly basis, on a monthly basis, or on a yearly basis) is divided by a predetermined time (a time shorter than the predetermined period, for example, on a minutely basis, on an hourly basis, on a daily basis, on a weekly basis, or on a monthly basis), the number of electromagnetic noises occurred in the predetermined time deviates from a predetermined range, it is considered that the electromagnetic noise is irregularly occurred.

FIG. 1 illustrates the communication system 300 in which the wireless devices 200 are arranged in a lattice pattern, but the arrangement of the wireless devices 200 is not limited to this case. Each of the plurality of wireless devices 200 is in a range in which communication can be performed between itself and the plurality of wireless devices 200 other than itself. The communication includes at least one of transmission and reception required for communication, transmission of a signal, and reception of a signal. Although FIG. 1 illustrates a case in which communication between the estimation apparatus 100 and the wireless device 200 and communication between the wireless devices 200 are performed wirelessly, communication connection between the estimation apparatus 100 and the wireless device 200 may be wired. The communication between the estimation apparatus 100 and the wireless device 200 may be performed via a relay device (not illustrated). As the wireless communication standard of the present embodiment, any standard such as Wifi (registered trademark), Bluetooth (registered trademark), UWB (Ultra Wide Band), and so on can be applied.

There is a difference in propagation data between the plurality of wireless devices 200 between the case where electromagnetic noise is occurred and the case where electromagnetic noise is not occurred. Specifically, when electromagnetic noise is occurred, the wireless device 200 on the reception side is likely to fail to receive the signal for measuring the propagation data transmitted from the wireless device 200 on the transmission side, and the result appears in the propagation data. For example, reception of a packet transmitted from the wireless device 200 on the transmission side (hereinafter also referred to as a transmission packet) by the wireless device 200 on the reception side is likely to fail compared to a case where electromagnetic noise is not occurred. The estimation apparatus 100 recognizes the above-described difference in propagation data by calculating a statistic in communication between the wireless devices 200 based on the propagation data. Furthermore, the estimation apparatus 100 estimates the position at which electromagnetic noise occurs based on the position information. When calculating the statistic in the communication between the wireless devices 200, the estimation apparatus 100 may calculate the statistic using the success or failure of the communication or the index of the communication. Examples of the communication index include a packet error rate (PER), a signal to noise ratio (SN ratio), or the like. The estimation apparatus 100 can apply any other index related to communication.

Figure 2:
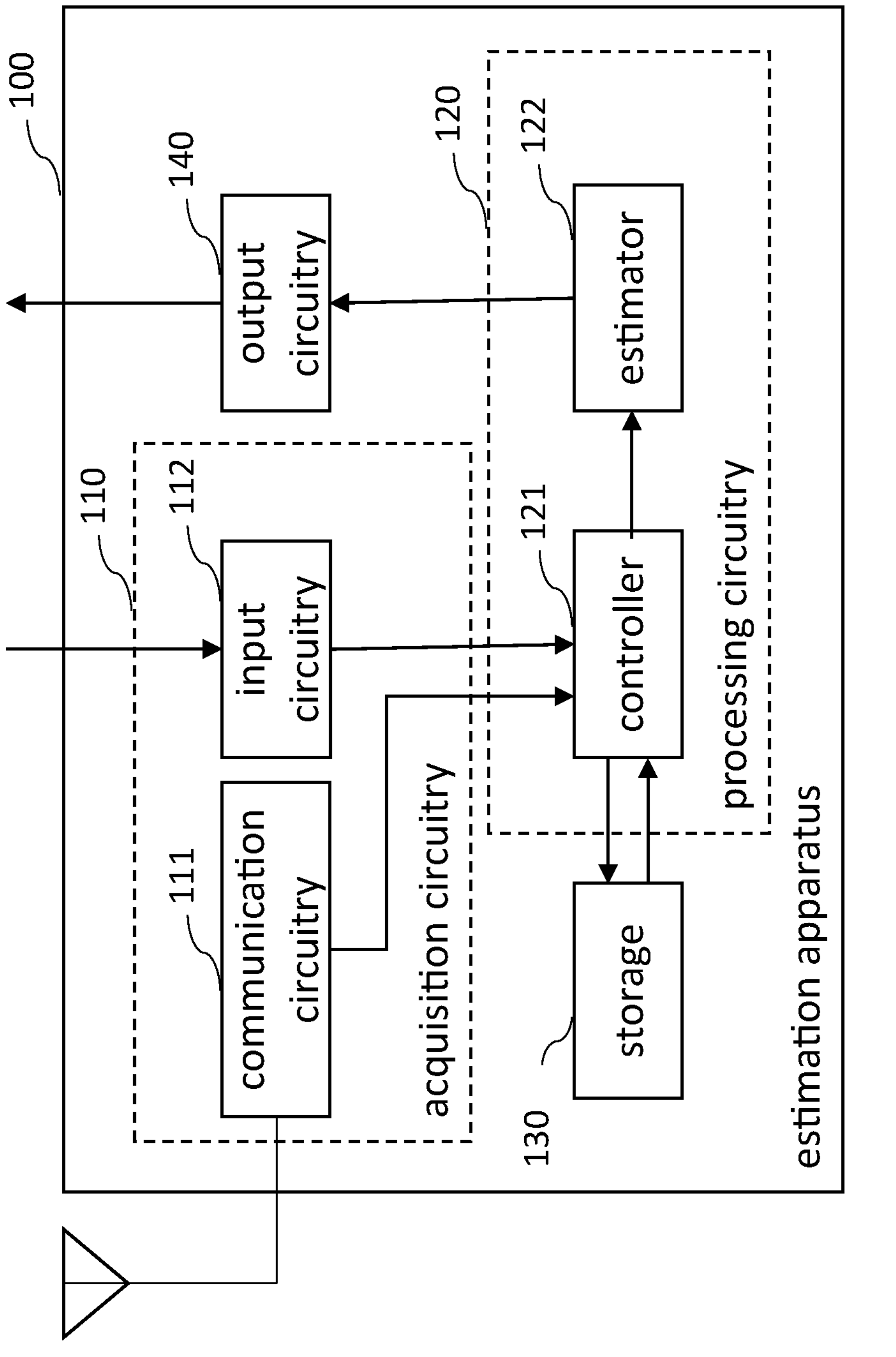
FIG. 2 is a configuration diagram of an estimation apparatus 100 according to the first embodiment.

FIG. 2 is a configuration diagram of the estimation apparatus 100. The estimation apparatus 100 includes an acquisition circuitry 110, a processing circuitry 120, a storage 130, and an output circuitry 140. The acquisition circuitry 110 includes a communication circuitry 111 and an input circuitry 112, and the processing circuitry 120 includes a controller 121 and an estimator 122.

The communication circuitry 111 includes an antenna and transmits and receives a wireless signal by communication. For example, it is possible to communicate with the plurality of wireless devices 200 other than itself, a database, or the like. The communication circuitry 111 receives and acquires communication information from the wireless devices 200 other than itself. The communication information includes, for example, propagation data indicating a PER, an SN ratio, success or failure of reception in communication between the plurality of wireless devices 200, identification information of the wireless device 200 in communication between the plurality of wireless devices 200, and the like. The identification information of the wireless device 200 is information for specifying each wireless device 200, and the estimation apparatus 100 can individually specify each wireless device 200 included in the communication system 300 by the identification information. Hereinafter, the identification information of the wireless device 200 is also referred to as wireless device identification information. The wireless device identification information is, for example, a MAC address or an IP address, but any information can be applied as long as each wireless device 200 can be individually specified. The communication circuitry 111 may acquire the communication information through wireless communication with a database or the like. The communication information is used to estimate a position where electromagnetic noise is occurred.

The input circuitry 112 acquires input information or acquires information by performing an information processing process on an object. For example, the input circuitry 112 may acquire the position information of the plurality of wireless devices 200 by input from the user, may acquire the position information by image processing or the like by inputting or scanning a drawing in which the positions of the plurality of wireless devices 200 are described, or may acquire the position information by image processing or the like by capturing or inputting an image representing the installation situation of the plurality of wireless devices 200. The position information is used to estimate a position where electromagnetic noise is occurred.

Although the acquisition circuitry 110 includes the communication circuitry 111 and the input circuitry 112 in FIG. 2, one of them may be provided, or a new circuitry for acquiring information or a signal may be further provided. In the present exemplary embodiment, as an example, the communication circuitry 111 acquires communication information and the input circuitry 112 acquires position information. Any acquisition method is applicable as long as the acquisition circuitry 110 can acquire the communication information and the position information. For example, the communication circuitry 111 may acquire the communication information and the position information, and the input circuitry 112 may not be provided. In this case, the communication circuitry 111 may acquire the position information through wireless communication with a database or a device holding the position information. Alternatively, the input circuitry 112 may acquire the communication information and the position information, and the communication circuitry 111 may not be provided. In this case, the input circuitry 112 may acquire the communication information through wired communication with a database or a device holding the communication information. The communication information and the position information acquired by the acquisition circuitry 110 are sent to the controller 121.

The controller 121 causes the storage 130 to hold the communication information and the position information transmitted from the acquisition circuitry 110. The controller 121 extracts at least one piece of information from the information held in the storage 130 and sends the extracted information to the estimator 122. In addition, the controller 121 may cause the storage 130 to hold information indicating the estimated position where the electromagnetic noise occurs.

The estimator 122 estimates a position at which electromagnetic noise occurs based on the communication information and the position information transmitted from the controller 121. Specifically, the estimator 122 calculates a statistic in the communication between the plurality of wireless devices 200 based on the communication information, and estimates the position where the electromagnetic noise occurs based on the calculated statistic and the position information. Details will be described later. The estimator 122 sends information indicating the estimated position at which the electromagnetic noise occurs to the output circuitry 140.

In FIG. 2, the controller 121 and the estimator 122 are included in the processing circuitry 120. The processing circuitry 120 is one or more electronic circuits including a control device and an arithmetic device. The electronic circuit is realized by an analog or digital circuit or the like. For example, a general-purpose processor, a central processing unit (CPU), a microprocessor, a digital signal processor (DSP), an application specific integrated circuit (ASIC), a field programmable gate array (FPGA), and combinations thereof are possible. In addition, the processing circuitry 120 may be executed by these electronic circuits by software or a program.

The storage 130 holds information sent from the controller 121. The storage 130 is a memory or the like, and is, for example, a random access memory (RAM), a programmable ROM (PROM), an erasable PROM (EPROM), an electrically EPROM (EEPROM), a flash memory, a register, or the like. In addition, the storage 130 may be provided inside or outside the estimation apparatus 100. When provided externally, the storage 130 may be a cloud that holds information via the Internet.

The output circuitry 140 outputs information indicating the estimated position at which the electromagnetic noise occurs, which is sent from the estimator 122. The output destination and a form of this information are freely-selectable, and for example, a device for analyzing information indicating a position at which electromagnetic noise occurs, a device for visually or aurally displaying or notifying information, a device for holding information, or the like is used. These devices may be elements (not illustrated) inside the estimation apparatus 100 or may be provided outside the estimation apparatus 100. In addition, the output circuitry 140 may include a part of the communication circuitry 111 and may output information indicating a position where electromagnetic noise is occurred by communication.

The configuration of the estimation apparatus 100 has been described above. The estimator 122 may send information indicating the estimated position at which the electromagnetic noise occurs to the controller 121. The controller 121 may hold this information in the storage 130, extract it as necessary, and send it to the output circuitry 140.

Figure 3:
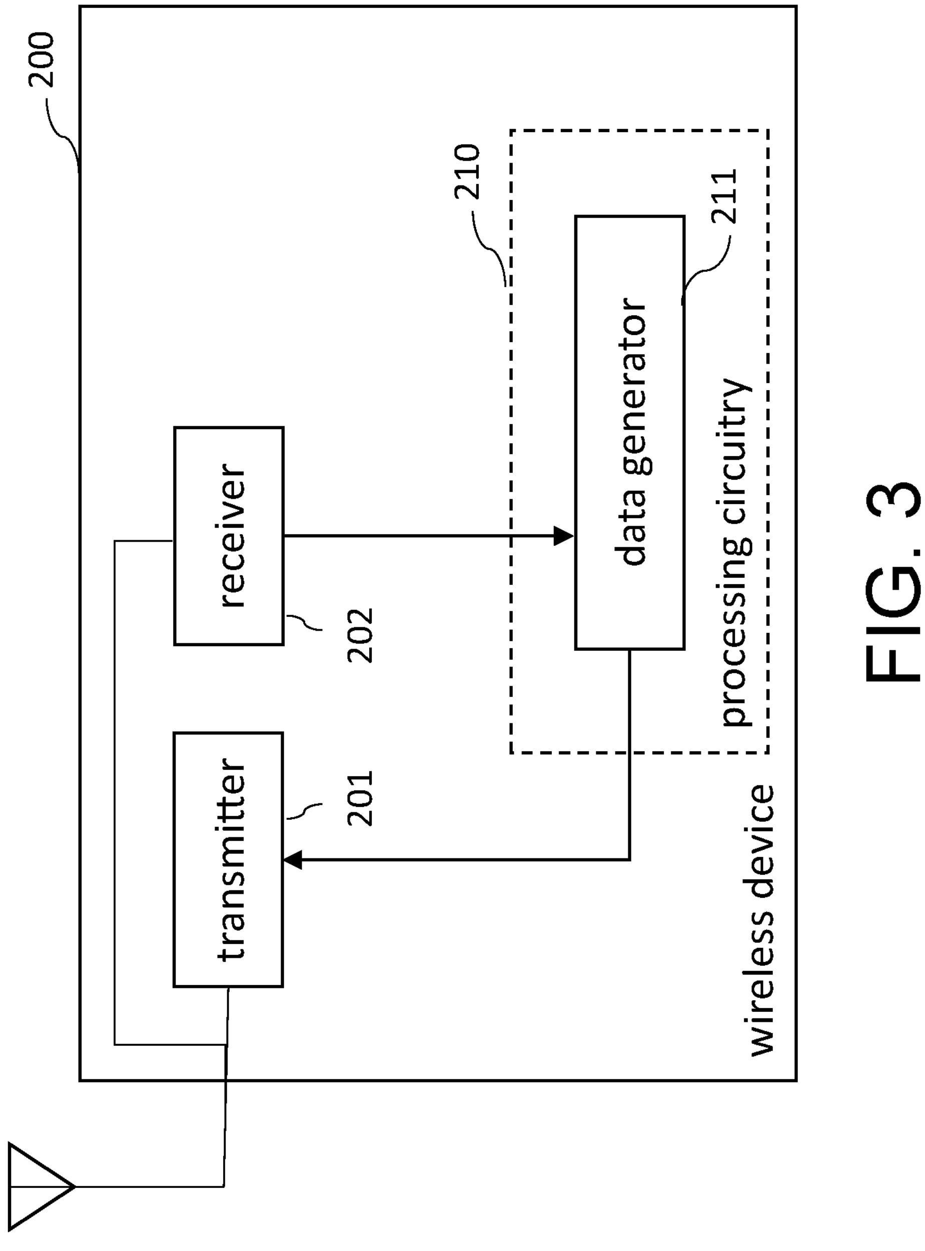
FIG. 3 is a configuration diagram of a wireless device 200 according to the first embodiment.

FIG. 3 is a configuration diagram of the wireless device 200. The wireless device 200 includes a transmitter 201, a receiver 202, and a processing circuitry 210. The processing circuitry 210 includes a data generator 211.

The transmitter 201 modulates a signal (hereinafter, also referred to as a transmission signal) for measuring propagation data between the wireless devices 200 of the transmission destination and transmits the signal via the antenna. The transmission signal includes wireless device identification information of the wireless device 200 of the transmission source and identification information of the signal (hereinafter, also referred to as signal identification information). Since communication between the wireless device 200 on the transmission side and the wireless device 200 on the reception side is performed a plurality of times, the number of times of communication is represented by the signal identification information. For example, a transmission packet number may be used. The transmission form of the transmission signal is freely-selectable, and the transmission signal may be transmitted by designating the wireless device 200 of the transmission destination, may be transmitted by broadcasting, or may be transmitted in synchronization with the wireless device 200 of the transmission destination.

In addition, when receiving communication information including propagation data from the data generator 211 to be described later, the transmitter 201 modulates the communication information and transmits the communication information to the estimation apparatus 100 via the antenna. When the transmission to the estimation apparatus 100 is performed using a relay device, a cloud, or the like, the transmitter 201 may transmit the communication information to the relay device or the cloud.

The receiver 202 receives a transmission signal transmitted from the wireless device 200 of the communication destination via the antenna and demodulates the transmission signal. Hereinafter, the received transmission signal is also referred to as a reception signal. The received signal includes wireless device identification information and signal identification information of the wireless device 200 of the transmission source. The receiver 202 sends information included in the reception signal to the data generator 211.

The data generator 211 associates information included in the reception signal sent from the receiver 202 (for example, the wireless device identification information and the signal identification information of the wireless device 200 on the transmission side) with the wireless device identification information of the wireless device 200 on the reception side (itself) and the propagation data of the reception signal to generate communication information. As the propagation data, for example, data indicating success or failure of reception, or data indicating PER is used. The data generator 211 sends the generated communication information to the transmitter 201 and instructs the transmitter 201 to transmit the communication information to the estimation apparatus 100.

In addition, the data generator 211 generates a transmission signal when propagation data is measured between the wireless devices 200. The data generator 211 sends the generated transmission signal to the transmitter 201 and instructs the transmitter 201 to transmit the transmission signal to the wireless device 200 of the communication destination.

The configuration of the wireless device 200 has been described above. In the communication system 300 according to the present exemplary embodiment, the wireless device 200 includes at least the above-described components. Although the transmitter 201 and the receiver 202 share an antenna in FIG. 3, they may have different antennas or may have a plurality of antennas and share a part of them. As the processing circuitry 210, a device similar to the device described in the processing circuitry 120 can be applied, and the function may be executed by software or a program. In the present embodiment, since the estimation apparatus 100 and the wireless device 200 perform wireless communication, the communication information is transmitted from the transmitter 201. However, in the case of wired connection, the wireless device 200 may include an output circuitry (not illustrated), and the communication information may be output from the output circuitry to the estimation apparatus 100. When there is a relay device or a cloud between the wireless device 200 and the estimation apparatus 100, the transmitter 201 or an output circuitry (not illustrated) may output the communication information to the relay device or the cloud.

Figure 4:
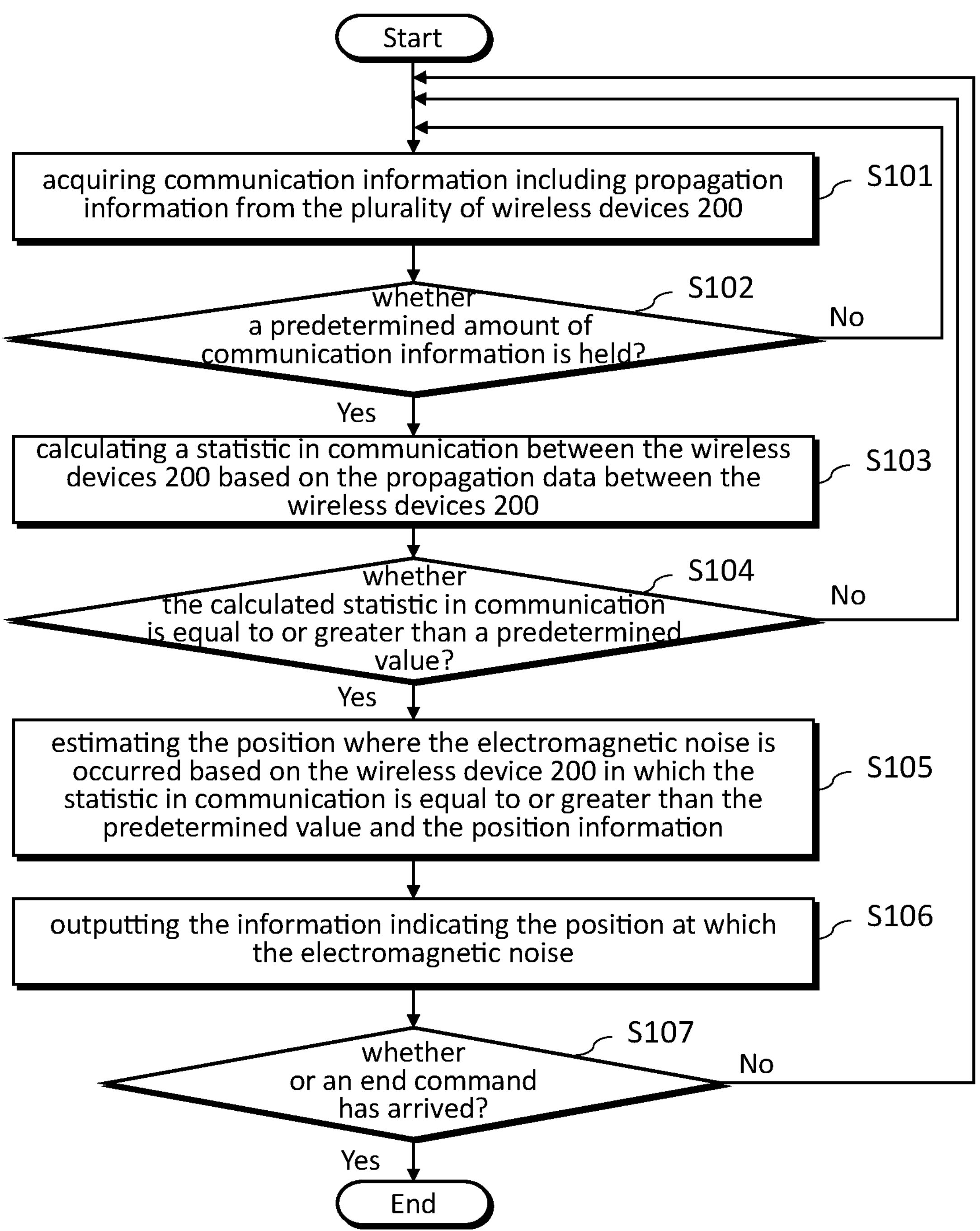
FIG. 4 is a flowchart of an estimation operation of the estimation apparatus 100 according to the first embodiment.

FIG. 4 is a flowchart of an estimation operation of the estimation apparatus 100. Hereinafter, the operation of the estimation apparatus 100 will be described in detail with reference to FIG. 4. It is assumed that transmission and reception necessary for communication between the wireless devices 200 has already been completed. In addition, it is assumed that the estimation apparatus 100 specifies each of the wireless devices 200 based on the wireless device identification information included in the communication information, and holds the position information of the wireless devices 200 in the storage 130 in advance. Further, in the present embodiment, as an example, a case where the propagation data indicates success or failure of reception will be described.

Figure 5:
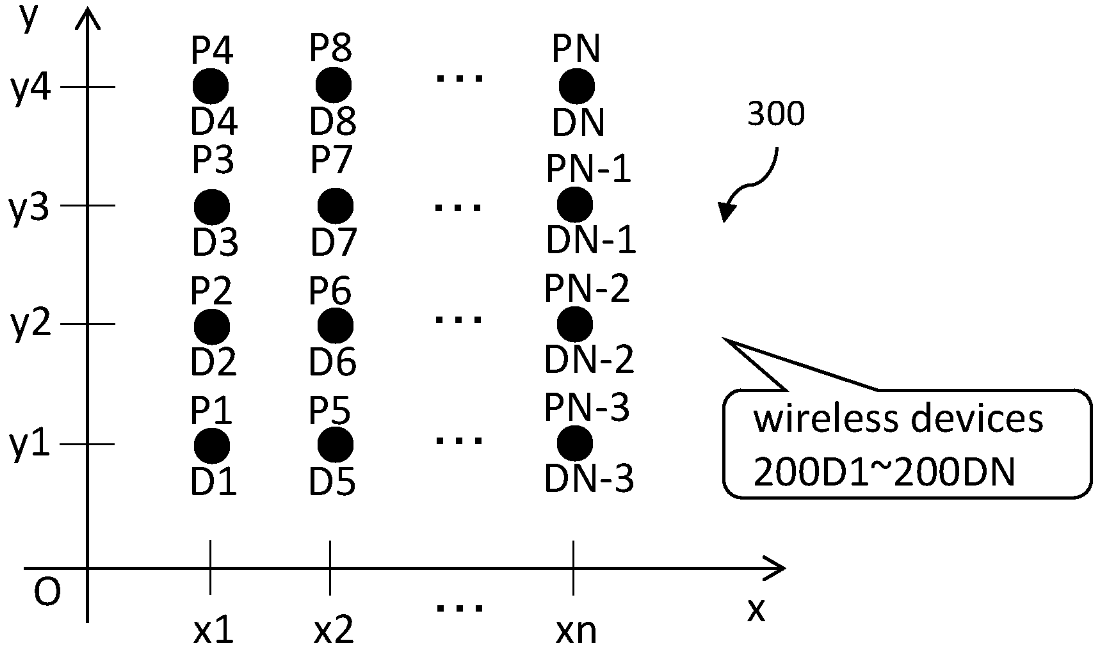
FIG. 5 is a diagram illustrating an example of positions where the wireless devices 200 are installed in the communication system 300.

Hereinafter, positions of the wireless devices 200 will be described. FIG. 5 illustrates an example of the positions where the wireless devices 200 are installed in the communication system 300 according to the present exemplary embodiment. The communication system 300 includes N wireless devices 200D1 to 200DN. The location of the plurality of wireless devices 200 are denoted by P. For example, the position of wireless device 200D1 is represented by P1, the position of wireless device 200D2 is represented by P2, . . . , and the position of wireless device 200DN is represented by PN. Coordinates are set for each position P. This coordinate may be an absolute coordinate or a relative coordinate provided with some reference. In the example of FIG. 5, the position P is represented by an x coordinate and a y coordinate. For example, the position P1 is represented as (x, y)=(x1, y1), the position P2 is represented as (x, y)=(x1, y2), . . . , and the position PN is represented as (x, y)=(xn, y4). The estimation apparatus 100 knows where the wireless devices 200D1 to 200DN are located.

The description returns to the flowchart of the estimation apparatus 100. The acquisition circuitry 110 acquires communication information including propagation information from the plurality of wireless devices 200D1 to 200DN (step S101). In the present embodiment, since the estimation apparatus 100 and the wireless devices 200D1 to 200DN are wirelessly connected to each other, the communication circuitry 111 acquires communication information via an antenna. The acquisition circuitry 110 may acquire the communication information by communicating with each of the wireless devices 200D1 to 200DN, or may acquire the communication information from the aggregated wireless devices after aggregating the communication information into several wireless devices among the wireless devices 200D1 to 200DN. The communication information may be collected from the wireless devices 200D1 to 200DN to a relay device, a cloud, or the like (not illustrated), and the acquisition circuitry 110 may acquire the communication information from the relay device, the cloud, or the like.

The propagation information included in the communication information generated and output by the wireless devices 200D1 to 200DN will be described below. As described above, the transmission side wireless device 200 transmits the transmission signal (transmission packet) including the wireless device identification information and the signal identification information of the transmission side wireless device 200 to the transmission destination wireless device 200. The wireless device 200 on the reception side receives the transmission signal, further associates the wireless device identification information of the wireless device 200 on the reception side (itself) with the success or failure of reception of the transmission signal, and generates the communication information.

Figure 6:
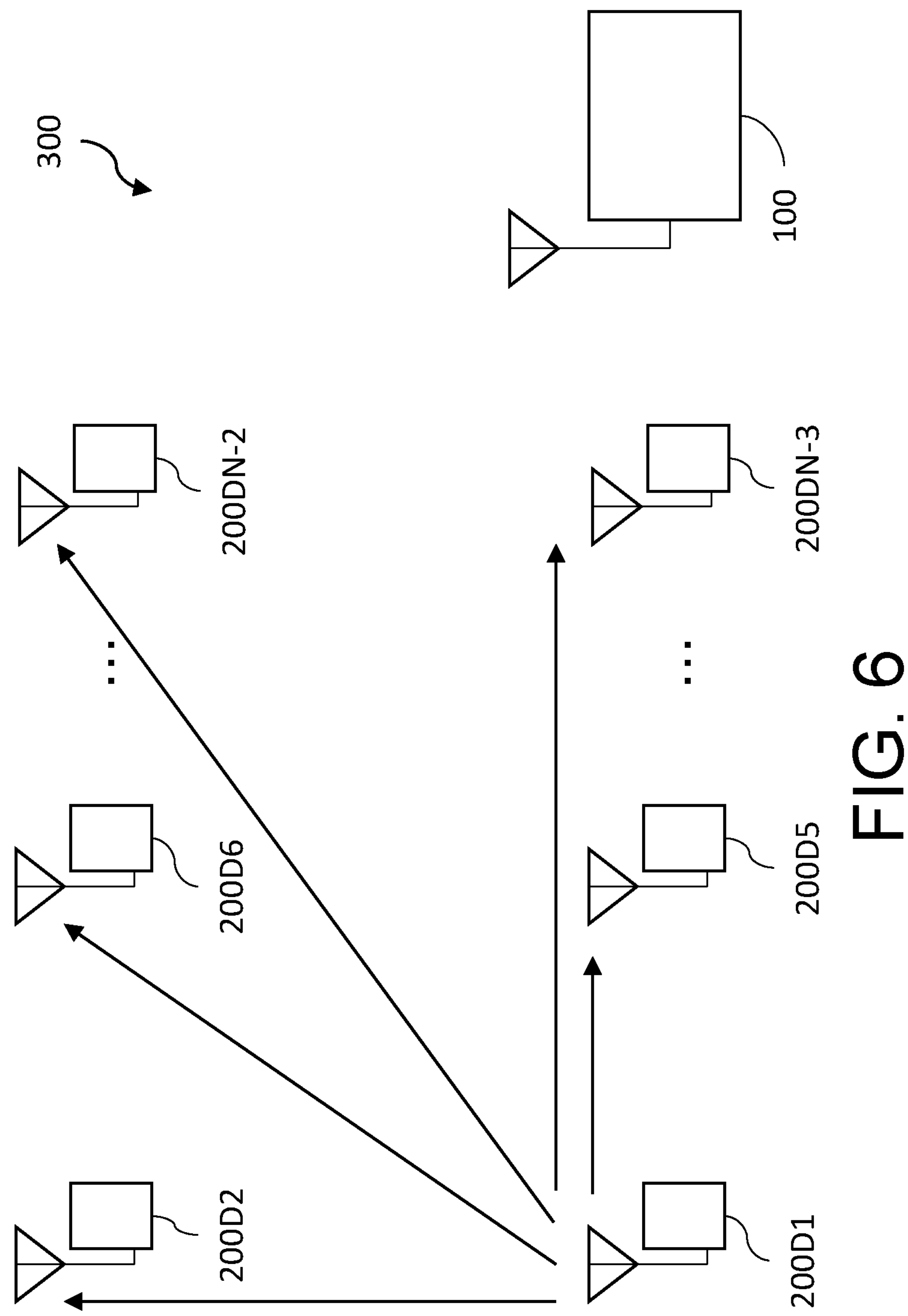
FIG. 6 is a diagram illustrating transmission of signals from the wireless device 200 on the transmitting side to the wireless devices 200 on the receiving side.

FIG. 6 illustrates transmission of the transmission signal from the wireless device 200D1 to the other wireless devices 200D2 to 200DN as an example. In the present embodiment, as an example, the transmission signal is transmitted by broadcasting. The wireless devices 200D2 to 200DN receive the transmission signal from the wireless device 200D1, and generate communication the information including success or failure of reception of the transmission signal as the propagation information. The transmission of the transmission signal from the wireless device 200D1, the reception by the wireless devices 200D2 to 200DN, and the generation of the communication information are performed a plurality of times. Similarly to the wireless device 200D1, the wireless devices 200D2 to 200DN transmit the transmission signal, and the wireless devices 200 other than the wireless device 200 that has transmitted the transmission signal receive the transmission signal and generate the communication information.

Figure 7:
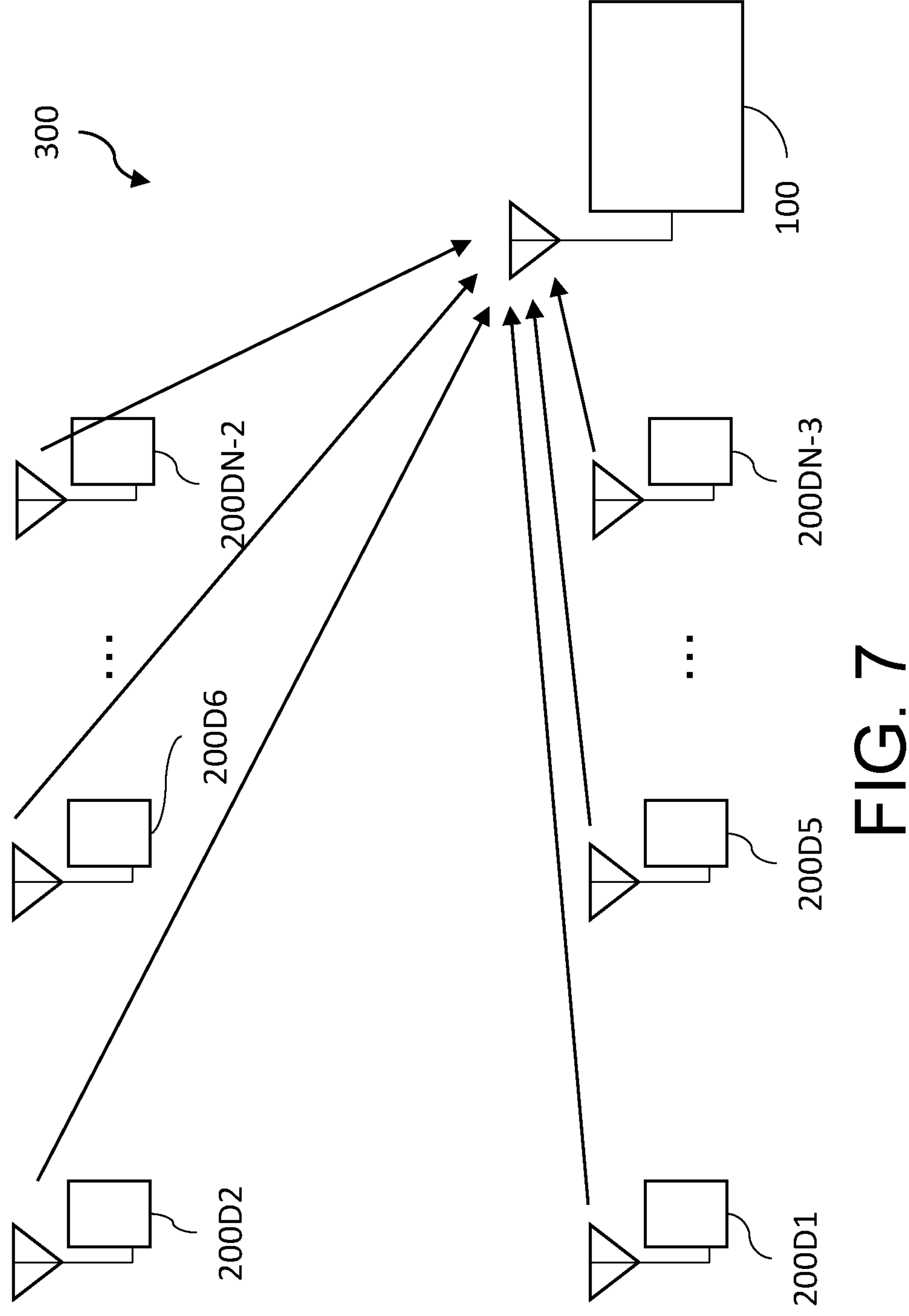
FIG. 7 is a diagram illustrating transmission of signals including propagation data from the wireless devices 200 to the estimation apparatus 100.

FIG. 7 illustrates that the wireless devices 200D1 to 200DN that have generated the communication information transmit the communication information to the estimation apparatus 100. The wireless devices 200D1 to 200DN may transmit the generated communication information to the estimation apparatus 100 each time, may store the generated communication information in a storage (not illustrated) and transmit the communication information when a predetermined amount of communication information is accumulated in the storage, or may transmit the communication information in a predetermined time period. The acquisition circuitry 110 acquires the transmitted communication information. The acquired communication information is demodulated and sent to the controller 121. The controller 121 causes the storage 130 to hold the communication information.

The controller 121 checks whether a predetermined amount of communication information is held in the storage 102 (step S102). The type of the amount is freely-selectable, for example, a data capacity or the number of data. Also, the amount may be freely-selectable. In the present embodiment, the type and amount of data are set in advance in the controller 121, and step S102 is performed. When the communication information does not satisfy the predetermined amount (step S102: No), the process returns to step S101, and the acquisition of the communication information is continued. Note that step S102 and the subsequent steps may be performed at predetermined time intervals or in predetermined time zones separately from the acquisition of the communication information in step S101.

On the other hand, when the communication information satisfies the predetermined amount (step S102: Yes), the controller 121 reads out the position information and the communication information from the storage 130 and sends them to the estimator 122.

The estimator 122 calculates a statistic in communication between the wireless devices 200 based on the propagation data between the wireless devices 200 (step S103). Before describing the statistics in this communication, the communication between the wireless devices 200 when electromagnetic noise is occurred and the propagation data generated by the wireless devices 200D1 to 200DN will be described.

Figure 8:
FIG. 8 is a diagram illustrating transmission of signals from the wireless device 200 on the transmission side to the wireless devices 200 on the reception side when electromagnetic noise occurs in the case of FIG. 6.
Figure 8:
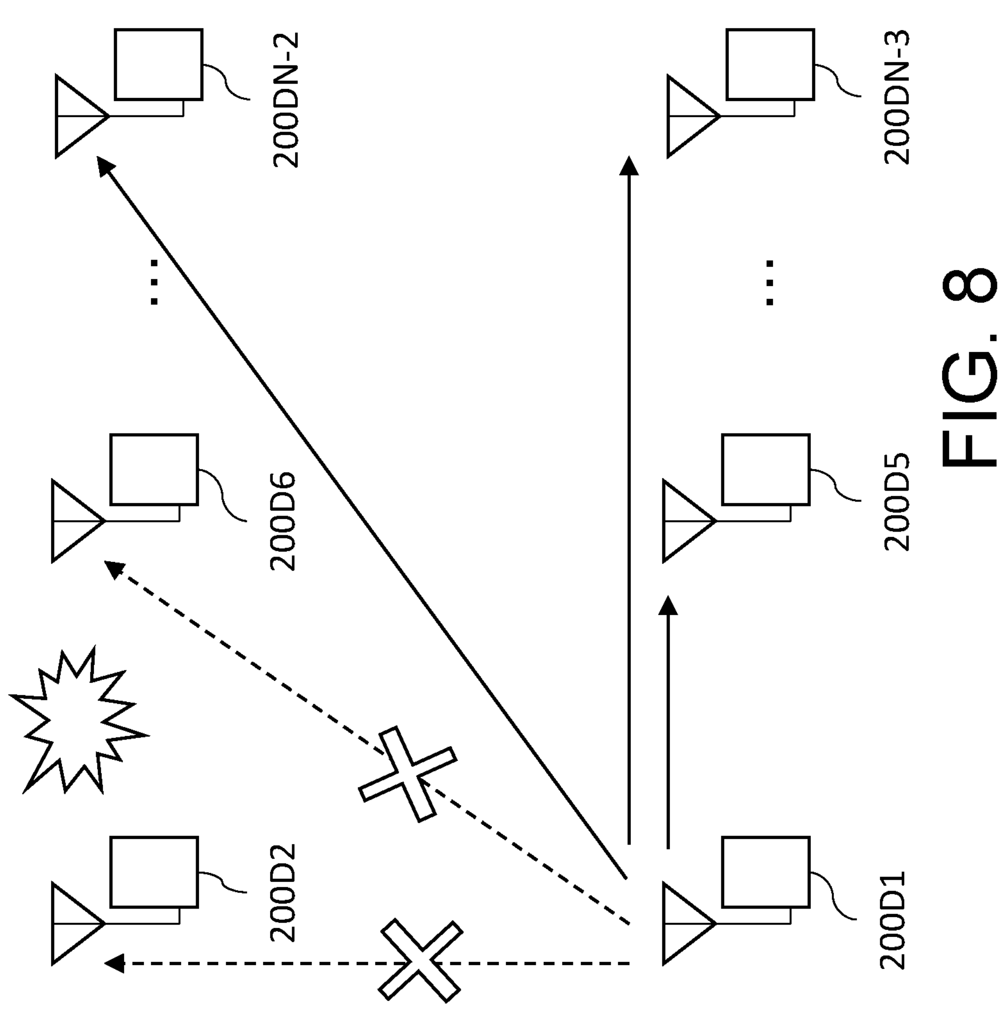

FIG. 8 illustrates transmission of a signal from the transmission side wireless device 200 to the reception side wireless devices 200 when electromagnetic noise is occurred in the case of FIG. 6. FIG. 8 illustrates a case where the transmission signal is transmitted from the wireless device 200D1 to the wireless devices 200D2 to 200DN. At this time, it is assumed that electromagnetic noise temporarily occurs between the wireless devices 200D2 and 200D6. In FIG. 8, the position where the electromagnetic noise is occurred is schematically indicated by an explosion mark. When electromagnetic noise occurs, there is a high possibility that the wireless device 200 affected by the electromagnetic noise fails to receive the transmission signal. In FIG. 8, communication to the wireless devices 200D2 and 200D6 is represented by a broken line and an X mark, and communication to the wireless devices 200 affected by electromagnetic noise and does not affect reception of the transmission signal is represented by solid lines.

FIG. 9 illustrates the success or failure of reception of the wireless devices 200D2 to 200DN in a case where the wireless device 200D1 is the transmission side. Transmission of the transmission signal from the wireless device 200D1 to the wireless devices 200D2 to 200DN is performed a plurality of times. The transmission signal includes transmission packet number (transmission pkt No.) as signal identification information. In FIG. 9, for each of the wireless devices 200D2 to 200DN, a case where the wireless device 200 has succeeded in receiving the transmission signal from the wireless device 200D1 is represented as circle mark, and a case where the wireless device 200 has failed to receive the transmission signal is represented as cross mark.

In a case where the reception of the transmission signal (for example, the number 1 is assigned as the signal identification information) is successful in the wireless device 200 on the reception side, propagation data indicating that the reception of the transmission signal is successful is generated. On the other hand, when the signal identification information of the transmission signal can be recognized but reception of the transmission signal as a whole fails, propagation data indicating that reception of the transmission signal fails is generated. When the wireless device 200 on the reception side fails to receive the transmission signal, there are a plurality of methods for recognizing the failure as reception failure.

When the transmission packet numbers of the transmission signals are continuously set, by referring to the transmission packet number of the transmission signal received next, it is possible to recognize whether or not there is a transmission signal which has failed to be received before the transmission signal received next, and it is possible to recognize which transmission signal has failed to be received. In the example of FIG. 9, the wireless device 200D2 successfully receives the transmission signal with the transmission packet number 2, and then successfully receives the transmission signal with the transmission packet number 4. At this time, the wireless device 200D2 can recognize that the reception of the transmission signal having the transmission packet number 3 therebetween has failed. In addition, for the transmission signal having the transmission packet number 10, the wireless device 200 on the transmission side of the next and subsequent transmission signals is changed. When reception of next transmission signal is successful, it is possible to recognize that reception of the transmission number having the transmission packet number 10 has failed since the wireless device 200 on the transmission side is changed. Even when the transmission side wireless device 200 does not continuously transmit the transmission signal a plurality of times at a time, when the transmission packet numbers of the transmission signals are continuously set or the order in which the transmission side wireless devices 200 are switched is shared by the wireless devices 200D1 to 200DN, it is possible to recognize the presence of the transmission signal that has failed to be received when the next reception of the transmission signal is successful.

When the time zone for transmitting the transmission signal is set for each transmission packet number, the failure of the transmission signal can be recognized by the lapse of the time zone. The time period in which the transmission signal is transmitted may be set in advance for each transmission packet number and shared among the wireless devices 200D1 to 200DN, or a predetermined time period from the transmission of the signal serving as the trigger may be set as the time period in which the transmission signal is transmitted.

The communication between the wireless devices 200 when electromagnetic noise occurs and the propagation data generated by the wireless devices 200D1 to 200DN have been described above. Hereinafter, the statistics in communication between the wireless devices 200 calculated by the estimator 122 will be described.

As described with reference to FIGS. 8 and 9, the occurrence of electromagnetic noise increases the possibility that reception by the nearby wireless device 200 affected by electromagnetic noise will fail as compared with the case where electromagnetic noise is not occurring. There is a plurality of methods for the estimator 122 to calculate the statistic in the communication between the wireless devices 200.

Hereinafter, the first method will be described up to step S105. The estimator 122 calculates a ratio of packets that the plurality of wireless devices 200 have failed to receive to all packets to be transmitted as a statistic in communication based on the success or failure of reception by the wireless devices 200 on the reception side. Taking FIG. 9 as an example, there are transmission packet numbers that have failed to be received in the plurality of wireless devices 200. In FIG. 9, the transmission packet numbers that the wireless devices 200D2 and 200D6 have failed to receive are 3, 5, and 8 (enclosed by broken lines), and the transmission packet number that the wireless devices 200D2 and 200D5 have failed to receive is 9 (enclosed by two dot chain lines).

Here, even if there is no electromagnetic noise, there may be a reception failure by the wireless devices 200 on the reception side due to other factors or errors. For example, the radio 200D5 and the radio 200DN are slightly affected by electromagnetic noise in FIG. 8, but fail to receive once in FIG. 9. However, there are three packet numbers that have failed to be received for both the wireless devices 200D2 and 200D6, and the ratio is 3/10. Although the estimator 122 counts packets including a plurality of wireless devices 200 that have failed to be received in the present embodiment, the "plurality" may be any number equal to or greater than any two. In addition, the estimator 122 may count packets that have been successfully received by a predetermined number of wireless devices 200 and calculate the ratio. When this ratio is subtracted from 1, it is the ratio at which the wireless devices 200 obtained by subtracting the predetermined number from all the wireless devices 200 fail to receive. Even in this case, it is regarded that the statistic in the communication between the wireless devices 200 is calculated.

The estimator 122 checks whether the calculated statistic in communication is equal to or greater than a predetermined value (step S104). The estimator 122 determines a threshold value of the rate of reception failure by the wireless device 200 on the reception side due to other factors or errors, and determines that reception failure occurs due to electromagnetic noise when the rate is equal to or greater than the threshold value. For example, in the present embodiment, it is determined that reception failures have occurred due to electromagnetic noise when three tenths or more of the reception failures in a plurality of the wireless devices 200 on the reception side have occurred.

When the calculated statistic in communication is less than the predetermined value (step S104: No), the estimator 122 determines that electromagnetic noise is not occurred in the communication system 300, and returns to step S101. On the other hand, when the calculated statistic in communication is equal to or greater than the predetermined value (step S104: Yes), the estimator 122 determines that electromagnetic noise is occurred in the communication system 300, and estimates the position where the electromagnetic noise is occurred based on the wireless device 200 in which the statistic in communication is equal to or greater than the predetermined value and the position information (step S105). In the case of the result of FIG. 9, the estimator 122 estimates that electromagnetic noise occurs between the wireless devices 200D2 and 200D6, or that electromagnetic noise in a range that affects both the wireless devices 200D2 and 200D6 occurs. Thus, the estimator 122 can estimate the position where the electromagnetic noise is occurred.

The estimator 122 can determine whether or not electromagnetic noise is occurred also based on the position information of the wireless devices 200. For example, in the arrangement of FIG. 6, it is assumed that a statistic in communication between the wireless devices 200D2 and 200DN-3 is equal to or larger than a predetermined value. However, in the arrangement of FIG. 6, when the influence of electromagnetic noise occurs in both the wireless devices 200D2 and 200DN-3, there is a high possibility that the wireless devices 200D5, 200D6 and the like existing therebetween are also influenced by electromagnetic noise. In this case, when the statistic in the communication between the wireless devices 200 existing between the wireless devices 200D2 and 200DN-3 is less than the predetermined value, it can be determined that the electromagnetic noise affecting both the wireless devices 200D2 and 200DN-3 is not occurred.

Hereinafter, the second method will be described up to step S105. The propagation data includes the success or failure of reception of the packet transmitted by the wireless device 200 on the transmission side by the wireless device 200 on the reception side, and includes the success or failure of reception when the wireless device 200 on the transmission side and the wireless device 200 on the reception side are reversed. The estimator 122 calculates a ratio of success or failure of reception of the wireless device 200 on the reception side for each wireless device 200 on the transmission side. As an example, in FIG. 10, the estimator 122 calculates the PER as the ratio of success or failure of reception. The estimator 122 calculates a difference in the rate of success or failure of reception as the statistic in communication in the same set of wireless devices 200. In the case of the second method, the PER of each wireless device 200 on the transmitting side in each wireless device 200 on the receiving side may be used as the propagation data.

Here, when there is slight influence or no influence of electromagnetic noise on the success or failure of reception of the transmission packet, the difference in the ratio of success or failure of reception approaches 0 in the same set of wireless devices 200. On the other hand, in a case where there is an influence of electromagnetic noise, the difference in the rate of success or failure of reception in the same set of wireless devices 200 is larger than in a case where there is slight influence or no influence of electromagnetic noise. This is because the wireless device 200 on the transmission side waits for transmission when there is an influence of electromagnetic noise in transmission and transmits after the influence of electromagnetic noise becomes small, whereas the wireless device 200 on the reception side cannot wait for reception.

When FIG. 9 is taken as an example, the wireless devices 200D2 and 200D6 have a difference of about 20 to 30% between the PER when they are on the reception side and the PER when they are on the transmission side. In FIG. 10, in the same set of wireless devices 200, wireless device 200 in which the difference in the rate of success or failure of reception is 20% or more are represented by being associated with each other by a broken-line box and an arrow.

The estimator 122 checks whether the calculated statistic in communication is equal to or greater than a predetermined value (step S104). The estimator 122 sets a predetermined threshold value for the difference in the rate of success or failure of reception, and determines that reception failure has occurred due to electromagnetic noise if the difference is equal to or greater than the threshold value. For example, in the present embodiment, when the difference in the rate of successful reception is 30% or more, it is determined that a reception failure has occurred due to electromagnetic noise in the wireless device 200 on the reception side having larger PER.

When the calculated statistic in communication is less than the predetermined value (step S104: No), the estimator 122 determines that electromagnetic noise is not occurred in the communication system 300, and returns to step S101. On the other hand, when the calculated statistic in communication is equal to or greater than the predetermined value (step S104: Yes), the estimator 122 determines that electromagnetic noise is occurred in the communication system 300, and estimates the position where the electromagnetic noise is occurred based on the wireless device 200 in which the statistic in communication is equal to or greater than the predetermined value and the position information (step S105). In the case of the result of FIG. 9, the estimator 122 estimates that electromagnetic noise occurs between the wireless devices 200D2 and 200D6, or that electromagnetic noise in a range that affects both the wireless devices 200D2 and 200D6 occurs. Thus, the estimator 122 can estimate the position where the electromagnetic noise is occurred. Note that the calculated statistic may be an absolute value of a difference in the ratio of success or failure of reception. In addition, although the PER is calculated as the rate of success or failure of reception in the present embodiment, the rate of success of reception may be calculated, and the difference between the rates of success of reception in a pair of two wireless devices 200 may be calculated. This is because the absolute value of the difference in the rate of successful reception is the same as the absolute value of the difference in the rate of unsuccessful reception. Even in this case, it is regarded that the statistic in the communication between the wireless devices 200 is calculated.

Similarly to the case of the first method, the estimator 122 can determine whether electromagnetic noise is occurred also based on the position information of the wireless devices 200.

The estimation of the position at which electromagnetic noise occurs has been described above with respect to the first method and the second method. The estimator 122 sends information indicating the estimated position at which the electromagnetic noise occurs to the output circuitry 140.

The output circuitry 140 outputs the information indicating the position at which the electromagnetic noise is occurred sent from the estimator 122 to an output destination (step S106). When the information indicating the position at which the electromagnetic noise is occurred is held in the storage 130, the controller 121 may receive the information from the estimator 122 and hold the information in the storage 130. The controller 121 may extract the information from the storage 130 and send the information to the output circuitry 140 as necessary, and the output circuitry 140 may output the information to the output destination.

The controller 121 checks whether or not an end command for terminating the operation of the estimation apparatus 100 has arrived (step S107). This end command is a command to end the operation of the estimation apparatus 100 in this flow. The end command is sent to the controller 121 by an input to the estimation apparatus 100 by the user or by the estimation apparatus 100 acquiring a signal including the end command. The end command may be a command for immediately ending the operation of the estimation apparatus 100.

When the end command has not reached the controller 121 (step S107: No), the process returns to step S101. On the other hand, when the end command has reached the controller 121 (step S107: Yes), the flow ends, and the estimation apparatus 100 ends the operation. After returning to step S101, the estimation apparatus 100 may perform the operation of this flow again according to an freely-selectable condition. When the flow returns, the controller 121 may delete the communication information that is used a predetermined number of times (for example, once) from the storage 130.

The estimation apparatus 100 according to the present embodiment has been described above. The estimation apparatus 100 described in the present embodiment is an example, and various modifications can be implemented and executed. Hereinafter, modified examples of the communication system 300 including the estimation apparatus 100 will be described. In the modifications, the same components and steps as those described in the first embodiment are denoted by the same reference numerals, and description thereof will be omitted. The modifications described below can be used in combination with each other.

(Modification 1)

In the estimation of the position where the electromagnetic noise is occurred, by narrowing down the wireless devices 200 that acquire the propagation data, it is possible to reduce the communication amount of the wireless devices 200, reduce the estimation load of the estimation apparatus 100, and improve the accuracy of the estimation of the position where the electromagnetic noise is occurred.

Figure 11:
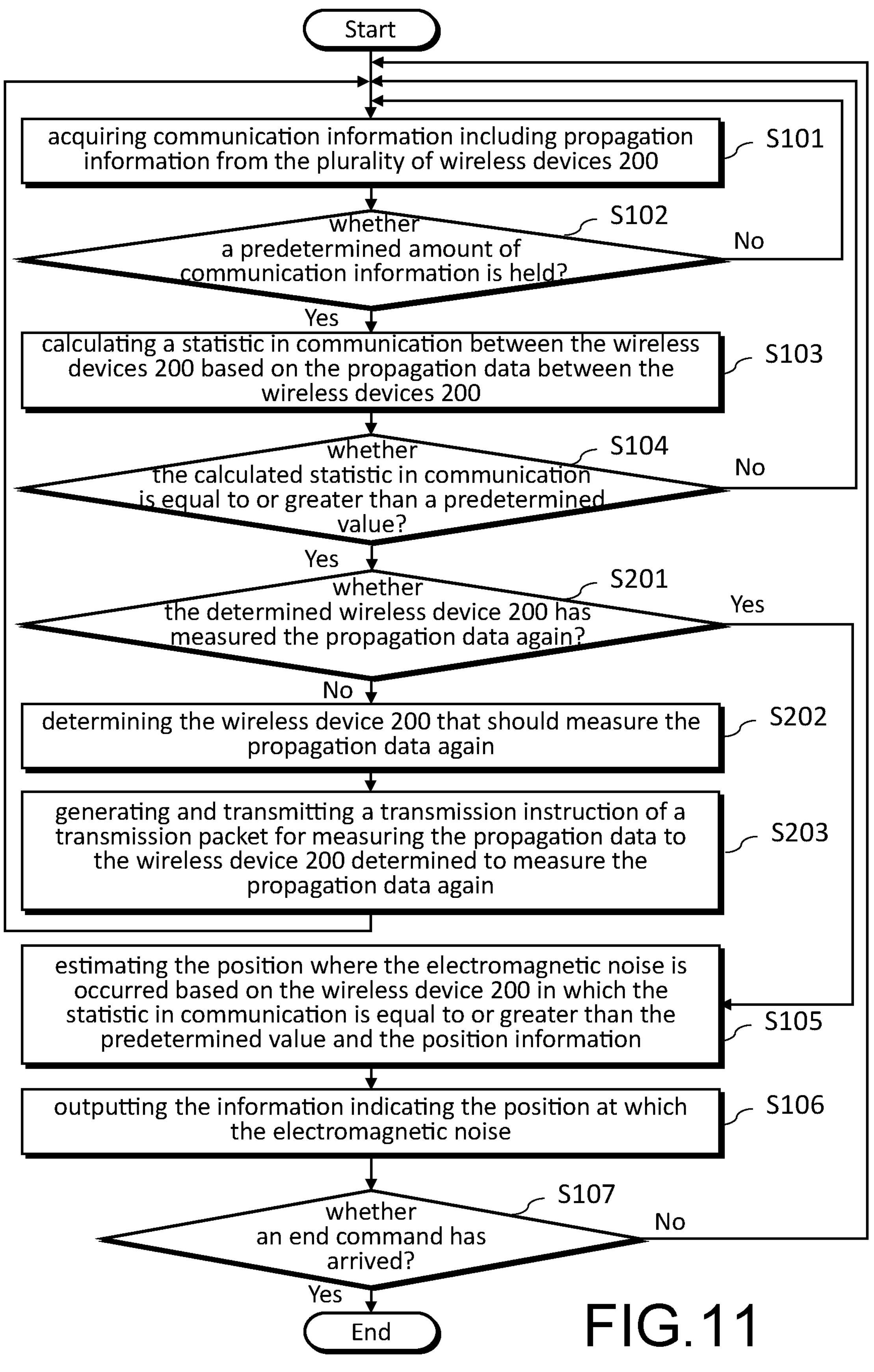
FIG. 11 is a flowchart of an estimation operation of the estimation apparatus 100 applicable to the first embodiment.

FIG. 11 is a flowchart of an estimation operation of the estimation apparatus 100 according to the first modification. Hereinafter, the operation of the estimation apparatus 100 will be described in detail with reference to FIG. 11.

In the first modification, the statuses S101 to 104 are the same as those in the present embodiment. In step S104, when the statistic in the communication is equal to or larger than the predetermined value (step S104: Yes), the estimator 122 checks whether the determined wireless device 200 has measured the propagation data again (step S201). In the first modification, in order to narrow down the wireless devices 200 from which propagation data is to be acquired again, the process goes to step S202 when it's a first time.

When the determined wireless device 200 did not measure the propagation data again (step S201: No), the estimator 122 determines the wireless device 200 that should measure the propagation data again (step S202). In Modification 1, the predetermined amount of propagation data in step S102 and the predetermined value to be compared with the statistic in communication used in step S104 may be set to amounts and values different from those in the first embodiment. For example, in step S102, in the first embodiment, as an example, the wireless device 200 on the transmission side transmits the transmission packet ten times. However, in the first modification, the transmission packet may be transmitted fewer times. Regarding step S104, as an example in the first embodiment, in the first method, it is assumed that the electromagnetic noise is occurred when failures of a plurality of reception side wireless devices 200 occur in three tenths or more of packets, and in the second method, when the difference in PER is 30% or more. In Modification 1, the ratio of the failures or the difference of the PER may be smaller. This is because the wireless devices 200 for measuring the propagation data are narrowed down, and the position where the electromagnetic noise is occurred is estimated based on the propagation data of the narrowed wireless devices 200.

On the other hand, when the determined wireless device 200 has not measured the propagation data again (step S201: Yes), the process proceeds to step S105 and subsequent steps. Since Step S105 and subsequent steps have already been described in the first embodiment, repeated description is omitted.

The estimator 122 generates a transmission instruction of a packet (transmission packet) for measuring the propagation data. the communication circuitry 111 transmits the transmission packet via the antenna to the wireless device 200 determined to measure the propagation data again (step S203). As a result, it is possible to narrow down the wireless devices 200 that measure the propagation data, reduce the communication amount of the wireless device 200, reduce the estimation load of the estimation apparatus 100, and improve the accuracy of the estimation of the position where the electromagnetic noise is occurred. After step S203, the process returns to step S101.

When the propagation data is measured again, the predetermined amount of propagation data in step S102 and the predetermined value to be compared with the statistic in the communication used in step S104 may be set to amounts and values different from those described above. For example, in step S102, although a smaller number of transmission packets may be transmitted than in the example described in the first embodiment, a larger number of transmission packets may be transmitted than in the example described above. For step S104, in the above example, the ratio of failures of receiving the transmission packets of multiple receiving wireless devices 200 may be less than 3/10 in the first method and the difference in PER may be less than 30% in the second method, but may be more than in the above example. Even if the amount of propagation data handled for each set of two wireless devices 200 is increased, since the number of the wireless devices 200 that measure propagation data narrow down, the overall processing load is unlikely to increase. In addition, since the position where the electromagnetic noise is occurred is estimated based on the propagation data of the narrowed wireless devices 200, it is possible to increase the accuracy of estimation by increasing the amount of propagation data handled for each set of two wireless devices 200.

(Modification 2)

In the first modification, the estimator 122 generates the transmission instruction of the packet (transmission packet) for measuring propagation data for the wireless device 200 determined to measure propagation data again. A plurality of instructions is conceivable as the transmission instruction.

As a first instruction, the estimator 122 may include an instruction to include data so that the determined wireless device 200 needs a transmission time of a predetermined period in the transmission packet. When a timing of the electromagnetic noise and a timing of the reception of the transmission packet overlap, the wireless device 200 on the reception side fails to receive the transmission packet. Therefore, by increasing the transmission time of the transmission packet, it is possible to increase the possibility that the electromagnetic noise and the reception timing of the transmission packet overlap. This data may be dummy data or may be data in the process of aggregating data to be transmitted to the estimation apparatus 100 in the wireless device 200 on the reception side. For example, the propagation data may be propagation data generated by the wireless device 200 on transmission side or may be data transmitted from still another wireless device 200 when the wireless device 200 on transmission side becomes a relay device. In a case where the wireless device 200 is attached to an apparatus, operation data of the apparatus may be used. For example, in the case of an electronic apparatus, the data may be power data in the electronic apparatus. As a second instruction, the estimator 122 may include an instruction to the determined wireless device 200 to increase the transmission frequency (more often) of the transmission packet for a predetermined period. By increasing the transmission frequency of the transmission packet, it is possible to increase the possibility that the timing of the electromagnetic noise and the timing of the reception of the transmission packet overlap.

As a third instruction, the estimator 122 may instruct to the determined wireless device 200 to delete data for error correction from the transmission packet or not to include the data for error correction in the transmission packet. When the timing of the electromagnetic noise and the timing of the reception of the transmission packet overlap and a reception error occurs, it is possible to cause the wireless device 200 on the reception side to determine that reception has failed.

(Modification 3)

By generating and transmitting the propagation data when there is a high possibility that electromagnetic noise is occurred, it is possible to reduce the power consumption of the estimation apparatus 100 and the wireless device 200.

Figure 12:
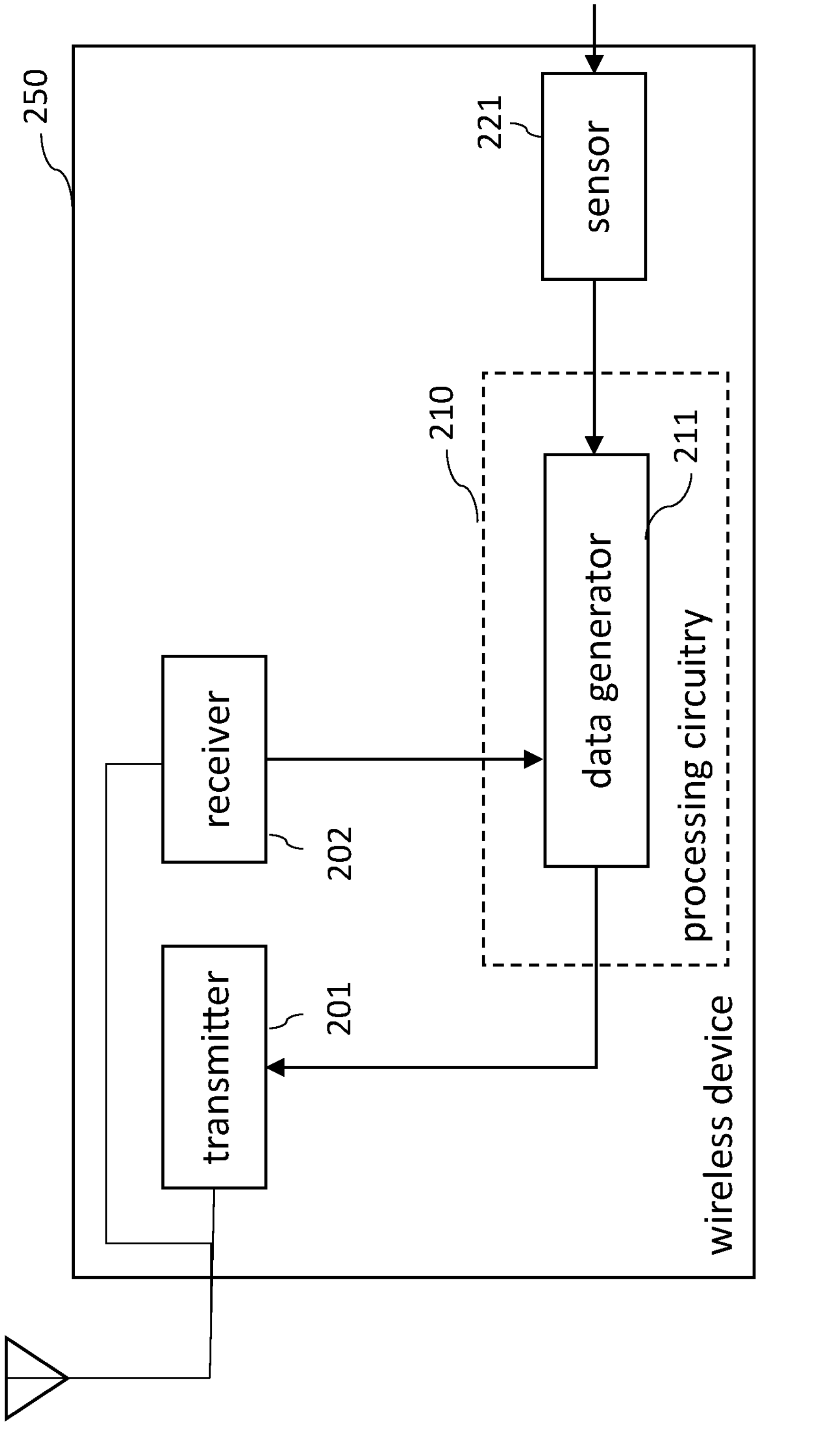
FIG. 12 is a configuration diagram of a wireless device 250 applicable to the first embodiment.

FIG. 12 is a configuration diagram of a wireless device 250 in which a sensor 221 is further provided in the wireless device 200. The sensor 221 measures the situation around. The data generator 211 generate the propagation data when a predetermined condition related to occurrence of electromagnetic noise is satisfied. Therefore, it is possible to reduce a period in which the estimation apparatus 100 and the wireless device 250 are operated and to reduce power consumption and exhaustion of the estimation apparatus 100 and the wireless device 250. The sensor 221 performs at least one of measurement of a physical quantity around the wireless device 250, capturing of a photograph or a video. Examples of the physical quantity include temperature, humidity, amount of rainfall, and amount of electric energy. At least one of the physical quantity, the photograph, or the video acquired by the sensor 221 is sent to the data generator 211.

The data generator 211 generates data indicating at least one of a physical quantity, a photograph, or a video sent from the sensor (hereinafter also referred to as sensor data), and sends the data to the transmitter 201. The data generator 211 instructs the transmitter 201 to transmit the sensor data to the estimation apparatus 100. The transmitter 201 transmits the sensor data to the estimation apparatus 100 via the antenna.

Figure 13:
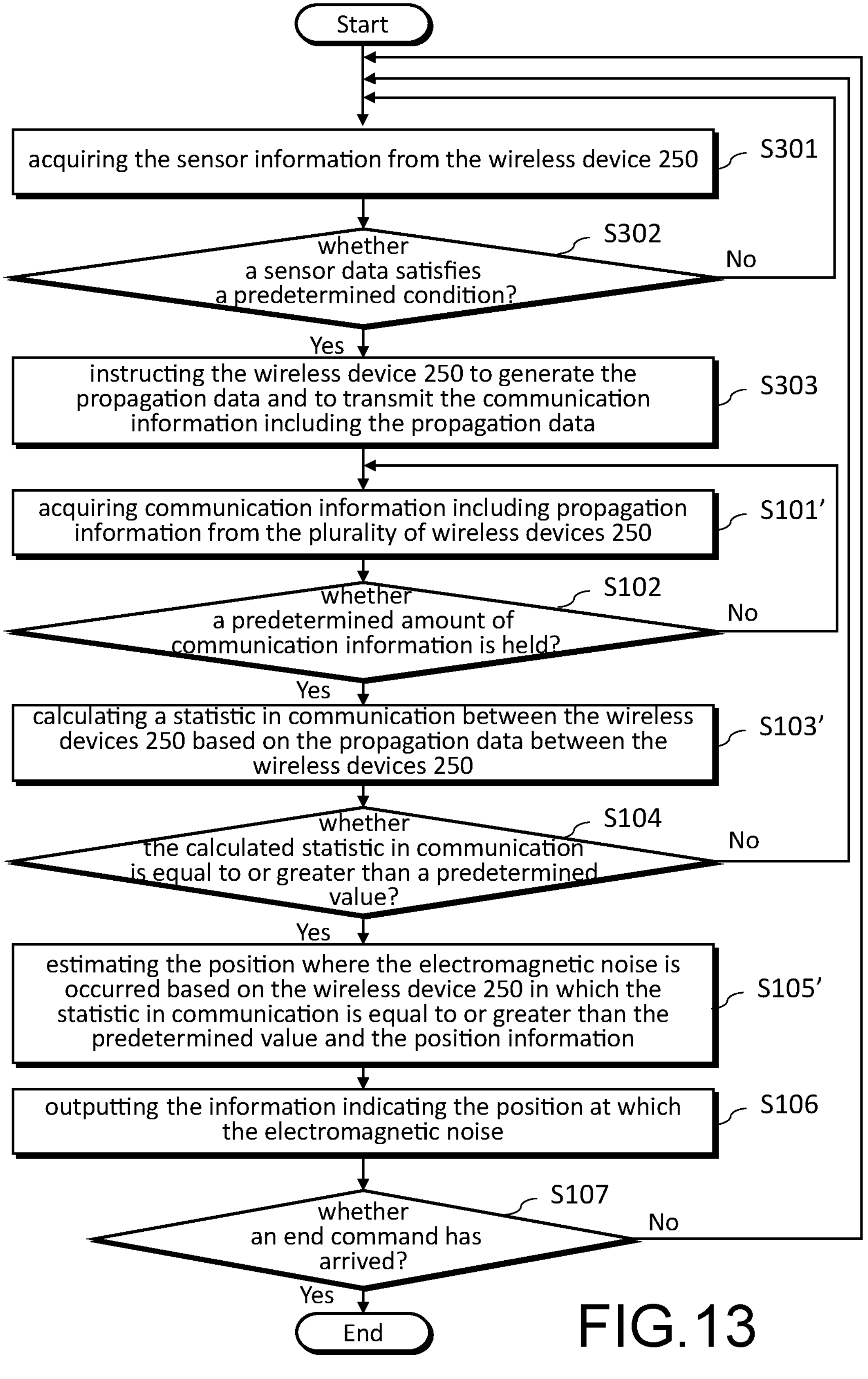
FIG. 13 is a flowchart of an estimation operation of the estimation apparatus 100 in the case of FIG. 12.

FIG. 13 is a flowchart of an estimation operation of the estimation apparatus 100 according to the third modification. Hereinafter, the operation of the estimation apparatus 100 will be described in detail with reference to FIG. 13.

The acquisition circuitry 110 acquires the sensor information from the wireless device 250 (step S301). In the third modification, the communication circuitry 111 acquires the sensor data by wireless communication as in the first embodiment. However, in the case of wired communication, the input circuitry 112 may acquire the sensor data. The acquired sensor data is sent to the controller 121.

The controller 121 checks whether there is a sensor data in which the environment around the wireless device 250 satisfies a predetermined condition (step S302). The predetermined condition is a condition in which electromagnetic noise is likely to be occurred around the wireless device 250. For example, the controller 121 determines whether there is high temperature, high humidity, large amount of rainfall, or the like around the wireless device 250 based on at least one of temperature, humidity, rainfall amount, power amount, photograph, or video analysis indicated by the sensor data. When the environment around the wireless device 250 satisfies a predetermined condition, the controller 121 determines that there is a high possibility that electromagnetic noise is occurred around the wireless device 250 by the controller 121. For example, high temperature, high humidity, or large amount of rainfall equal to or higher than a predetermined value tends to damage wiring inside the wireless device 250 or a cable of an apparatus in a case where the wireless device 250 is provided in the apparatus, and tends to deteriorate the wiring or the cable compared to a case where the wiring or the cable is not damaged. In addition, when spark discharge occurs from these wires and cables, spark discharge tends to occur easily in rainy weather. Here, when the power amount in the apparatus is low, there is a possibility that wiring inside the wireless device 250 or wiring of the apparatus where the wireless device 250 is provided is being damaged. Since there is a possibility that spark discharge occurs due to damage to the wiring, the controller 121 can also determine the possibility that electromagnetic noise occurs around the wireless device 250 based on the power amount.

As described above, when the controller 121 determines that electromagnetic noise is likely to occur based on the sensor data (step S302: Yes), the controller 121 instructs the wireless device 250 to generate the propagation data and to transmit the communication information including the propagation data (step S303). When the controller 121 determines that electromagnetic noise is not likely to occur (step S302: No), the process returns to step S301. Since step S303 and subsequent steps are subsequent to steps S101 to S107 described in the first embodiment, description thereof will be omitted. Although steps S101', S103', and S105' are described in FIG. 13, the contents are the same as those described in the first embodiment except that the wireless device 200 is changed to the wireless device 250.

As described above, it is possible to reduce power consumption and exhaustion of the estimation apparatus 100 and the wireless device 200 by measuring a situation around the wireless device 250 by the sensor 221 and instructing generation of propagation data when a predetermined condition related to generation of electromagnetic noise is satisfied.

Although the sensor data is transmitted from the wireless device 250 to the estimation apparatus 100 in the third modification, the wireless device 250 may check whether the environment around the wireless device 250 satisfies a predetermined condition on the basis of the sensor data. In this case, steps S301 to S303 in FIG. 13 are performed by the wireless device 250, and the estimation apparatus 100 performs steps S101' to S107.

(Modification 4)

When the wireless device 200 includes a received signal strength indicator (RSSI) as the propagation data, it is possible to increase the accuracy of estimation of the position where the electromagnetic noise occurs.

Figure 14:
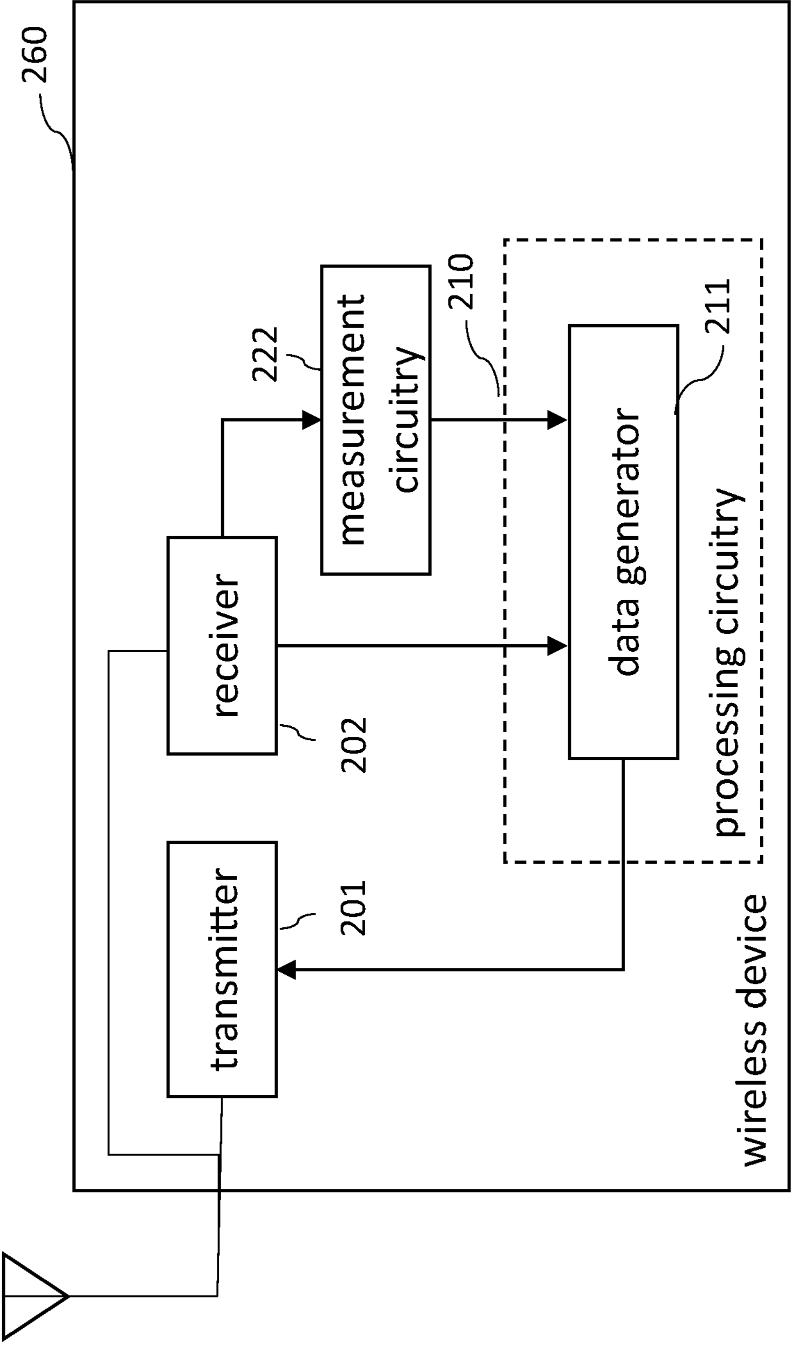
FIG. 14 is a configuration diagram of a wireless device 260 applicable to the first embodiment.

FIG. 14 is a configuration diagram of a wireless device 260 in which a measurement circuitry 222 is further provided in the wireless device 200. The measurement circuitry 222 measures propagation data of the received transmission signal. In the fourth modification, the measurement circuitry 222 further measures the RSSI as the propagation data. The measured RSSI is sent to the data generator 211. The data generator 211 generates the communication information by further including the RSSI as the propagation data. The communication information is transmitted from the transmitter 201 to the estimation apparatus 100 via the antenna.

Although the measurement circuitry 222 is not included in the processing circuitry 210 in FIG. 14, it may be included in the processing circuitry 210 depending on propagation data to be measured. For example, in a case that digital processing is required for measurement of propagation data.

The estimator 122 narrows down the propagation data based on the RSSI associated with the success or failure of the reception as the propagation data. When the RSSI is higher than the first reference, there is a high possibility that the wireless device 260 on the reception side succeeds in receiving the transmission packet even if electromagnetic noise is occurred. Therefore, regarding the success or failure of reception in which the RSSI is higher than the first reference, the estimator 122 may not use to estimate the position at which electromagnetic noise occurs. In addition, when the RSSI is lower than a second reference which is lower than the first reference, even if electromagnetic noise is not occurred, there is a high possibility that the wireless device 260 on the reception side fails to receive the transmission packet due to other factors. Therefore, regarding the success or failure of reception in which the RSSI is lower than the second reference, the estimator 122 may not use to estimate the position where the electromagnetic noise occurs.

The estimator 122 estimates the position where the electromagnetic noise occurs based on the propagation data (success or failure of reception) associated with the RSSI equal to or higher than the second criterion and equal to or lower than the first criterion, and thus it is possible to improve the accuracy of estimation.

The estimation apparatus 100 may instruct the wireless device 260 to transmit propagation data associated with a predetermined RSSI range to the estimation apparatus 100 in advance. The controller 121 may instruct the wireless device 260 to transmit communication information including measured propagation data (success or failure of reception) to the estimation apparatus 100 when the wireless device 260 receives a predetermined signal strength, for example, the wireless device 260 receives the transmission signal with an RSSI equal to or higher than a second reference and equal to or lower than a first reference. As a result, it is possible to improve the accuracy of estimation by the estimation apparatus 100 and to reduce communication information transmitted from the wireless device 260 to the estimation apparatus 100, thereby reducing the power consumption of the estimation apparatus 100 and the wireless device 260.

(Modification 5)

In the first embodiment, the estimation apparatus 100 acquires positions where the wireless devices 200 are located as position information. The estimation apparatus 100 may estimate the positions of the wireless devices 260 based on the propagation data (RSSI) measured by the wireless devices 260 according to the fourth modification and may hold the positions as the position information.

In this case, information indicating candidates for the positions at which the wireless devices 260 are installed (hereinafter, also referred to as position candidate information), is acquired by the acquisition circuitry 110. In the first embodiment, the position candidate information indicates the coordinates of the positions P1 to PN. Since the RSSI has a property of attenuating as the distance increases, it is possible to estimate the arrangement of the wireless devices 260 based on this property, the position candidate information, and the RSSI measured by the wireless device 260. Any method can be applied to the estimation of the arrangement of the wireless devices 260.

(Modification 6)

Figure 15:
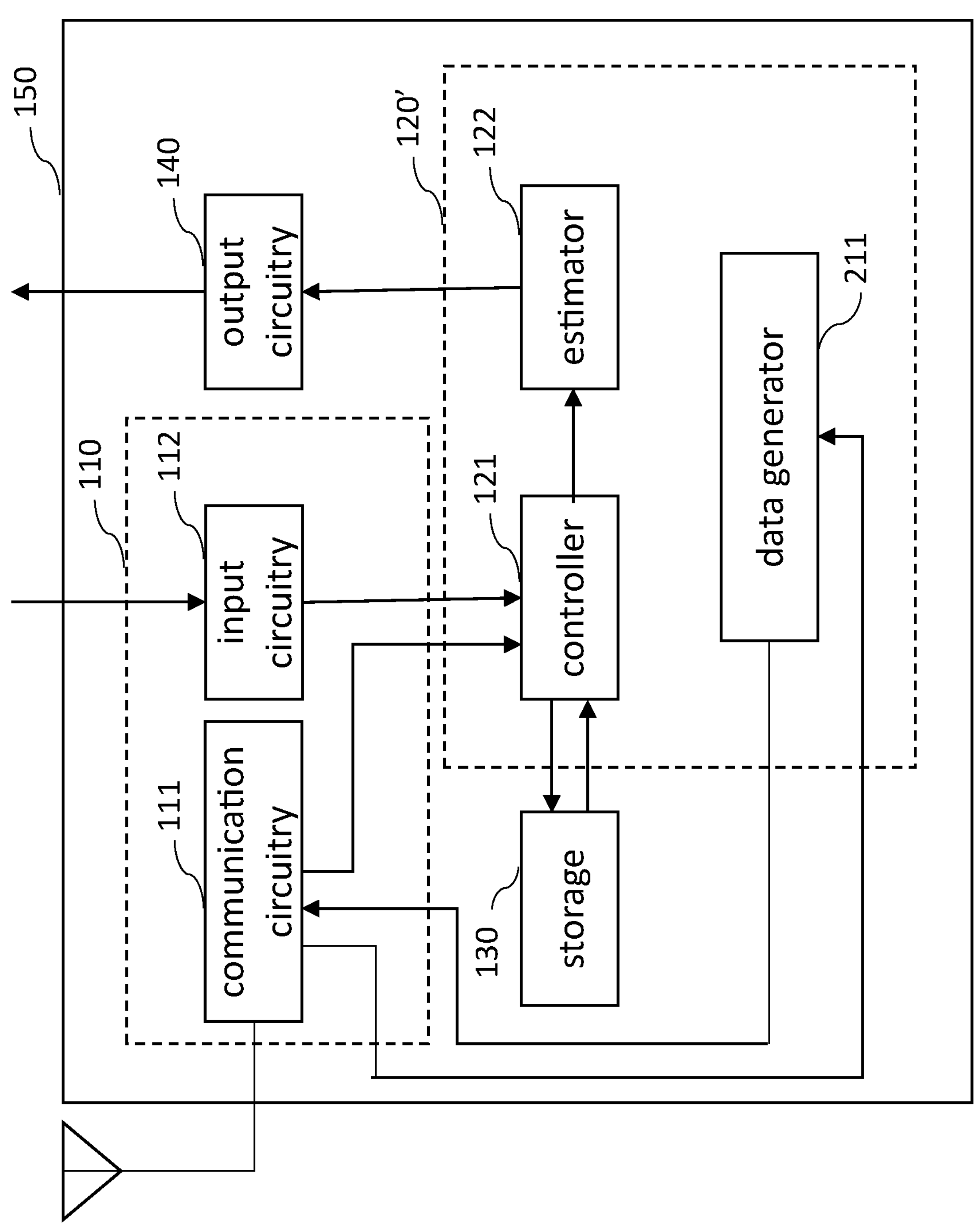
FIG. 15 is a configuration diagram of an estimation apparatus 150 applicable to the first embodiment.

The estimation apparatus 100 has functions of the wireless device 200 and may operate as one of the plurality of wireless devices 200. FIG. 15 is a configuration diagram of an estimation apparatus 150 in which the estimation apparatus 100 has the functions of the wireless device 200. The functions of the transmitter 201 and the receiver 202 of the wireless device 200 are performed by the communication circuitry 111, and a processing circuitry 120' further includes the data generator 211 as a component of the processing circuitry 120. The estimation apparatus 150 can perform both the operation of the estimation apparatus 100 and the operation of the wireless device 200 described in the first embodiment.

The modification of the estimation apparatus according to the present embodiment has been described above. Note that a plurality of methods and modification examples described in the present embodiment can be used in combination. The estimation apparatus according to the present exemplary embodiment estimates a position at which electromagnetic noise occurs based on propagation data in communication between the plurality of wireless devices and position information of the plurality of wireless devices. the estimation apparatus can estimate the position of the irregularly occurred electromagnetic noise. In addition, since the estimation apparatus estimate based on the propagation data between the wireless devices, it is possible to easily estimate the position where the electromagnetic noise occurs without using a special device that detects the electromagnetic noise.

According to an example of the present embodiment, the following electronic apparatus, electronic system, method, and storage medium are provided.

(1) An electronic apparatus comprising:

A processing circuitry configured to estimate a position at which electromagnetic noise occurs based on:

propagation data in communication between a first wireless device located at a first position and second wireless devices located at second positions; and position information indicating the first position and the second positions.

(2) The electronic apparatus according to (1), wherein the propagation data includes first data indicating success or failure of reception by the second wireless devices of a plurality of packets transmitted from the first wireless device, and the processing circuitry is configured to estimate the position at which the electromagnetic noise is occurred based on the first data and the position information.

(3) The electronic apparatus according to (2), wherein the processing circuitry is configured to:

calculate a ratio of the plurality of packets to packets including the wireless devices having the same success or failure of reception among the second wireless devices based on the first data; and estimate the position at which the electromagnetic noise occurs based on the ratio and the position information.

(4) The electronic apparatus according to (2) or (3), wherein the propagation data further includes second data indicating success or failure of reception by the first wireless device of a plurality of packets transmitted from at least one of the second wireless devices, and the processing circuitry is configured to estimate the position at which the electromagnetic noise is occurred based on the first data, the second data, and the position information.

(5) The electronic apparatus according to (4), wherein the processing circuitry is configured to:

calculate a difference between a ratio of success or failure of reception by the first wireless device and a ratio of success or failure of reception by at least one of the second wireless devices based on the first data and the second data; and estimate the position at which the electromagnetic noise occurs based on the difference and the position information.

(6) The electronic apparatus according to any one of (1) to (5), wherein the propagation data includes:

at least one of first data indicating success or failure of reception of a plurality of packets transmitted from the first wireless device by at least one of the second wireless devices and second data indicating success or failure of reception of a plurality of packets transmitted from at least the one of second wireless devices by the first wireless device; and data indicating reception strength of the packets, and the processing circuitry is configured to:

select a part of at least one of the first data and the second data based on the reception strength; and estimate the position at which the electromagnetic noise occurs based on the selected data and the position information.

(7) The electronic apparatus according to any one of (1) to (6), wherein the propagation data includes at least one of first data indicating success or failure of reception of a plurality of packets transmitted from the first wireless device by the second wireless device and second data indicating success or failure of reception of a plurality of packets transmitted from the second wireless device by the first wireless device, and the processing circuitry is configured to generate a transmission instruction of a packet for measuring propagation data in communication for at least two third wireless devices of the first wireless device and the second wireless devices based on at least one of the first data and the second data.

(8) The electronic apparatus according to (7), wherein the processing circuitry is configured to estimate the position at which the electromagnetic noise occurs based on the propagation data measured by the third wireless devices and the position information.

(9) The electronic apparatus according to (7), wherein the processing circuitry is configured to include, in the transmission instruction, an instruction to add data of a predetermined period to a packet to be transmitted by the third wireless devices.

(10) The electronic apparatus according to (7), wherein the processing circuitry is configured to include, in the transmission instruction, an instruction to increase a transmission frequency of packets to be transmitted by the third wireless devices for a predetermined period.

(11) The electronic apparatus according to (7), wherein the processing circuitry is configured to include, in the transmission instruction, an instruction to delete or not to include data for error correction from a packet to be transmitted by the third wireless devices.

(12) The electronic apparatus according to any one of (1) to (11), wherein the processing circuitry is configured to generate an instruction to transmit the measured propagation data to the electronic apparatus with respect to the first wireless device and the second wireless devices when a packet for measuring propagation data in communication is received with a predetermined signal strength.

(13) The electronic apparatus according to any one of (1) to (12), wherein the processing circuitry is configured to generate a transmission instruction of a packet for measuring propagation data in communication for the first wireless device and the second wireless devices based on information acquired by a sensor provided in at least one of the first wireless device and the second wireless devices.

(14) The electronic apparatus according to any one of (1) to (13), further comprising:

an acquisition circuitry to acquire the propagation data and the position information; and an output circuitry to output information indicating the position at which the electromagnetic noise occurs.

(15) The electronic apparatus according to any one of (1) to (14), further comprising a storage to hold at least one of the propagation data, the position information, and information indicating the position at which the electromagnetic noise is occurred.

(16) The electronic apparatus according to any one of (1) to (15), wherein the electromagnetic noise is caused by spark discharge.

(17) The electronic apparatus according to any one of (1) to (16), further comprising one of the first wireless device and the second wireless devices.

(18) An electronic system comprising:

the electronic apparatus according to any one of (1) to (17);

the first wireless device; and the second wireless devices.

(19) A method comprising:

estimating a position at which electromagnetic noise occurs based on:

propagation data in communication between a first wireless device located at a first position and second wireless devices located at second positions; and position information indicating the first position and the second positions.

(20) A non-transitory computer-readable storage medium having stored thereon a program which is executed by a computer of an electronic apparatus, the program comprising instructions capable of causing the computer to execute functions of:

estimating a position at which electromagnetic noise occurs based on:

propagation data in communication between a first wireless device located at a first position and second wireless devices located at second positions; and position information indicating the first position and the second positions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electronic apparatus comprising:

a processing circuitry configured to:

acquire communication information including propagation information from wireless devices;

determine whether a predetermined amount of the communication information is held;

if it is determined that the predetermined amount of the communication information is held, calculate a statistics in communication between the wireless devices based on the propagation information between the wireless devices;

determine whether the calculated statistics in the communication is equal to or greater than a predetermined value;

if it is determined that the calculated statistics is equal to or greater than the predetermined value, estimate a position at which electromagnetic noise occurs based on:

propagation data in communication between a first wireless device located at a first position and second wireless devices located at second positions; and position information indicating the first position and the second positions, wherein the propagation data includes first data indicating success or failure of reception by the second wireless devices of a plurality of packets transmitted from the first wireless device, and the processing circuitry is configured to estimate the position at which the electromagnetic noise occurred based on the first data and the position information, and wherein the processing circuitry is configured to calculate a ratio of the plurality of packets to packets including the wireless devices having the same success or failure of reception among the second wireless devices based on the first data, and estimate the position at which the electromagnetic noise occurs based on the ratio and the position information.

2. The electronic apparatus according to claim 1, wherein the propagation data further includes second data indicating success or failure of reception by the first wireless device of a plurality of packets transmitted from at least one of the second wireless devices, and the processing circuitry is configured to estimate the position at which the electromagnetic noise is occurred based on the first data, the second data, and the position information.

3. The electronic apparatus according to claim 2, wherein the processing circuitry is configured to:

calculate a difference between a ratio of success or failure of reception by the first wireless device and a ratio of success or failure of reception by at least one of the second wireless devices based on the first data and the second data; and estimate the position at which the electromagnetic noise occurs based on the difference and the position information.

4. The electronic apparatus according to claim 1, wherein the propagation data includes:

at least one of first data indicating success or failure of reception of a plurality of packets transmitted from the first wireless device by at least one of the second wireless devices and second data indicating success or failure of reception of a plurality of packets transmitted from at least the one of second wireless devices by the first wireless device; and data indicating reception strength of the packets, and the processing circuitry is configured to:

select a part of at least one of the first data and the second data based on the reception strength; and estimate the position at which the electromagnetic noise occurs based on the selected data and the position information.

5. The electronic apparatus according to claim 1, wherein the propagation data includes at least one of first data indicating success or failure of reception of a plurality of packets transmitted from the first wireless device by the second wireless device and second data indicating success or failure of reception of a plurality of packets transmitted from the second wireless device by the first wireless device, and the processing circuitry is configured to generate a transmission instruction of a packet for measuring propagation data in communication for at least two third wireless devices of the first wireless device and the second wireless devices based on at least one of the first data and the second data.

6. The electronic apparatus according to claim 5, wherein the processing circuitry is configured to estimate the position at which the electromagnetic noise occurs based on the propagation data measured by the third wireless devices and the position information.

7. The electronic apparatus according to claim 5, wherein the processing circuitry is configured to include, in the transmission instruction, an instruction to add data of a predetermined period to a packet to be transmitted by the third wireless devices.

8. The electronic apparatus according to claim 5, wherein the processing circuitry is configured to include, in the transmission instruction, an instruction to increase a transmission frequency of packets to be transmitted by the third wireless devices for a predetermined period.

9. The electronic apparatus according to claim 5, wherein the processing circuitry is configured to include, in the transmission instruction, an instruction to delete or not to include data for error correction from a packet to be transmitted by the third wireless devices.

10. The electronic apparatus according to claim 1, wherein the processing circuitry is configured to generate an instruction to transmit the measured propagation data to the electronic apparatus with respect to the first wireless device and the second wireless devices in response to a packet for measuring propagation data in communication is received with a predetermined signal strength.

11. The electronic apparatus according to claim 1, wherein the processing circuitry is configured to generate a transmission instruction of a packet for measuring propagation data in communication for the first wireless device and the second wireless devices based on information acquired by a sensor provided in at least one of the first wireless device and the second wireless devices.

12. The electronic apparatus according to claim 1, further comprising:

an acquisition circuitry to acquire the propagation data and the position information; and an output circuitry to output information indicating the position at which the electromagnetic noise occurs.

13. The electronic apparatus according to claim 1, further comprising a storage to hold at least one of the propagation data, the position information, and information indicating the position at which the electromagnetic noise is occurred.

14. The electronic apparatus according to claim 1, wherein the electromagnetic noise is caused by spark discharge.

15. The electronic apparatus according to claim 1, further comprising one of the first wireless device and the second wireless devices.

16. The electronic apparatus according to claim 1, wherein the processing circuitry is configured to receive the packets transmitted by broadcasting from the first wireless device.

17. An electronic system comprising:

the electronic apparatus according to claim 1;

the first wireless device; and the second wireless devices.

18. The electronic system according to claim 17, wherein the first wireless device transmits the packets by broadcasting.

19. A method comprising:

acquiring communication information including propagation information from wireless devices;

determining whether a predetermined amount of the communication information is held;

if it is determined that the predetermined amount of the communication information is held, calculating a statistics in communication between the wireless devices based on the propagation information between the wireless devices;

determining whether the calculated statistics in the communication is equal to or greater than a predetermined value;

if it is determined that the calculated statistics is equal to or greater than the predetermined value, estimating a position at which electromagnetic noise occurs based on:

propagation data in communication between a first wireless device located at a first position and second wireless devices located at second positions; and position information indicating the first position and the second positions, wherein the propagation data includes first data indicating success or failure of reception by the second wireless devices of a plurality of packets transmitted from the first wireless device, and the method comprises:

estimating the position at which the electromagnetic noise occurred based on the first data and the position information;

calculating a ratio of the plurality of packets to packets including the wireless devices having the same success or failure of reception among the second wireless devices based on the first data; and estimating the position at which the electromagnetic noise occurs based on the ratio and the position information.

20. A non-transitory computer-readable storage medium having stored thereon a program which is executed by a computer of an electronic apparatus, the program comprising instructions capable of causing the computer to execute functions of:

acquiring communication information including propagation information from wireless devices;

determining whether a predetermined amount of the communication information is held;

if it is determined that the predetermined amount of the communication information is held, calculating a statistic in communication between the wireless devices based on the propagation information between the wireless devices;

determining whether the calculated statistic in the communication is equal to or greater than a predetermined value;

if it is determined that the calculated statistics is equal to or greater than the predetermined value, estimating a position at which electromagnetic noise occurs based on:

propagation data in communication between a first wireless device located at a first position and second wireless devices located at second positions; and position information indicating the first position and the second positions, wherein the propagation data includes first data indicating success or failure of reception by the second wireless devices of a plurality of packets transmitted from the first wireless device, and the functions comprises:

estimating the position at which the electromagnetic noise occurred based on the first data and the position information;

calculating a ratio of the plurality of packets to packets including the wireless devices having the same success or failure of reception among the second wireless devices based on the first data; and estimating the position at which the electromagnetic noise occurs based on the ratio and the position information.

* * * * *